(12) United States Patent
Wilkinson et al.

(10) Patent No.: US 11,940,940 B2
(45) Date of Patent: Mar. 26, 2024

(54) EXTERNAL EXCHANGE CONNECTIVITY

(71) Applicant: Graphcore Limited, Bristol (GB)

(72) Inventors: Daniel Wilkinson, Bristol (GB);
Stephen Felix, Bristol (GB); Simon Knowles, Corston (GB); Graham Cunningham, Chippenham (GB);
David Lacey, Cheltenham (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/658,944

(22) Filed: Apr. 12, 2022

(65) Prior Publication Data
US 2023/0281144 A1 Sep. 7, 2023

(30) Foreign Application Priority Data

Mar. 1, 2022 (GB) ...................................... 2202793

(51) Int. Cl.
*G06F 13/40* (2006.01)
*G06F 9/30* (2018.01)
*G06F 9/52* (2006.01)

(52) U.S. Cl.
CPC ...... *G06F 13/4022* (2013.01); *G06F 9/30079* (2013.01); *G06F 9/522* (2013.01); *G06F 13/4027* (2013.01)

(58) Field of Classification Search
CPC .. G06F 13/4022; G06F 13/4027; G06F 9/522; G06F 9/30079
See application file for complete search history.

(56) References Cited

U.S. PATENT DOCUMENTS

| | | | |
|---|---|---|---|
| 8,738,860 B1* | 5/2014 | Griffin | G06F 12/0897 711/122 |
| 10,037,299 B1* | 7/2018 | Ramey | G06F 13/4221 |
| 2012/0198207 A1* | 8/2012 | George | G06F 15/80 712/E9.001 |
| 2017/0124024 A1* | 5/2017 | Alvarez-Icaza Rivera | G06F 15/80 |
| 2019/0073336 A1* | 3/2019 | George | G06F 1/3293 |
| 2021/0406115 A1* | 12/2021 | Felix | G06F 11/0793 |
| 2022/0021512 A1 | 1/2022 | Vickers | |
| 2022/0035760 A1* | 2/2022 | Lin | G06F 13/1684 |
| 2022/0214988 A1* | 7/2022 | Kaul | G06F 13/4022 |

OTHER PUBLICATIONS

Search Report dated Oct. 28, 2022 for United Kingdom Patent Application No. GB2202793.2. 3 pages.

* cited by examiner

*Primary Examiner* — Nimesh G Patel
(74) *Attorney, Agent, or Firm* — HAYNES AND BOONE, LLP

(57) ABSTRACT

A processing device has a plurality of interfaces and a plurality of processors. During different phases of execution of a computer program, different processors are associated with different interfaces, such that the connectivity between processors and interfaces for the sending of egress data and the receiving of ingress data may change during execution of that computer program. The change in this connectivity is directed by the compiled code running on the processors. The compiled code selects which buses associated with which interfaces, given processors are to connect to for receipt of ingress data. Furthermore, the compiled code causes control messages to be sent to circuitry associated with the interfaces, so as to control which buses associated with which processors, given interfaces are to connect to.

15 Claims, 17 Drawing Sheets

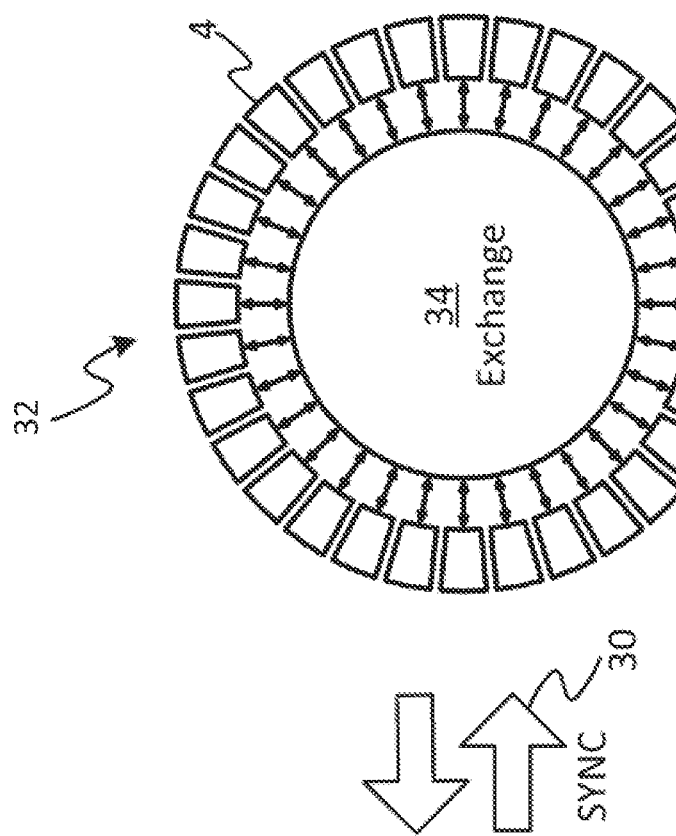
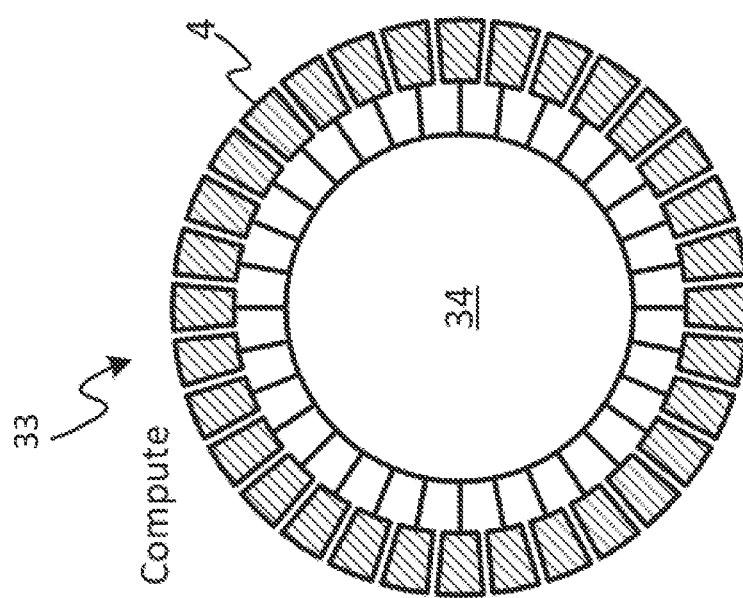
Figure 3

EXTERNAL EXCHANGE CONNECTIVITY

CROSS-REFERENCE TO RELATED APPLICATIONS

The present application claims priority to United Kingdom Patent Application No. GB2202793.2, filed Mar. 1, 2022, the disclosure of which is hereby incorporated herein by reference in its entirety.

TECHNICAL FIELD

The present disclosure relates to a data processing device comprising a plurality of processors, and in particular to a data processing device comprising a plurality of interfaces for enabling the exchange of data packets between the plurality of processors and external devices.

BACKGROUND

In the context of processing data for complex or high-volume applications, a processing unit for performing the processing of that data may be provided. The processing unit may function as a work accelerator to which the processing of certain data is offloaded from a host system. Such a processing unit may have specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a processing unit specialised for machine intelligence applications may comprise a large degree of multi-threading. One form of parallelism can be achieved by means of an arrangement of multiple tiles on the same chip (i.e. same die), each tile comprising its own separate respective execution unit and memory (including program memory and data memory). Thus separate portions of program code can be run in parallel on different ones of the tiles.

In order to further extend the processing volume, multiple such processing units may be connected together to form a larger system. As part of this larger system, additional components supporting the functionality of the processing units—e.g. memory modules, gateway devices—may also be provided. Providing multiple devices together in the system, generates a requirement for adequate connectivity in the system.

SUMMARY

In a processing device comprising multiple processors, multiple interfaces may be provided in order to enable the processors to communicate with different external devices. Such interfaces may be used to receive ingress data packets from the different external devices for provision to different processors. Such interfaces may also be used to provide egress data packets output by the processors to different external devices. One problem that is presented is how to ensure that ingress data received at an interface of the device is delivered to the appropriate processor of the device, and that egress data output by a processor is delivered to the appropriate interface for output from the device.

According to a first aspect, there is provided a data processing device comprising: a plurality of processors, each of the processors comprising an instruction memory comprising one of a plurality of local programs, the plurality of local programs defining at least part of a computer program; a plurality of interfaces enabling ingress data packets received from external devices to be provided to the plurality of processors; a switching fabric comprising a plurality of buses, wherein each of at least some of the buses is associated with a respective one of the interfaces and is configured to transport ones of the ingress data packets received on the respective one of the interfaces; and for each of the plurality of processors, switching circuitry associated with the respective processor, wherein each of at least some of the local programs comprises a schedule defining, for different phases of execution of the computer program, which of the interfaces its associated one of the processors is configured to connect to, wherein at least one of the plurality of processors is configured to, in dependence upon the schedule of its respective local program: control its associated switching circuitry to, during a first of the phases of execution of the computer program, connect to a first of the at least some of the buses so as to enable reception of a first set of the ingress data packets from a first of the interfaces; and control its associated switching circuitry to, during a second of the phases of execution of the computer program, connect to the second of the at least some of the buses so as to enable reception of a second set of the ingress data packets from a second of the interfaces.

Each of the interfaces is associated with a different bus on to which it outputs its data. By 'listening' to a selected one of the buses, any of the processors can receive data from a selected one of any of the interfaces. Each processor that is arranged to receive data packets from an external source, stores, as part of its local program, an indication as to which of the interfaces of the device it is to listen to during different phases of execution of the application. The processor controls its switching circuitry to connect to the bus of the appropriate interface during the relevant phase of execution in order to receive data. In this way, the connectivity of the device (i.e. which of its processors connect to which of the interfaces) is not fixed by the physical hardware, but is controlled by the code loaded into the processors and may be changed during execution of that code.

According to a second aspect, there is provided a data processing device comprising: a plurality of processors, each of the processors comprising an instruction memory storing a local program that is associated with the respective processor, the local programs of the processors together providing at least part of a computer program; a plurality of interfaces enabling egress data packets output from the plurality of processors to be provided to external devices; a switching fabric comprising a plurality of buses, wherein each of at least some of the buses is associated with one of the processors and is configured to transport ones of the egress data packets that are output by its associated one of the processors, wherein the processing device comprises, for each of the plurality of interfaces, switching circuitry associated with the respective interface and an interface circuit associated with the respective interface, wherein one of the plurality of processors is configured to, in dependence upon a schedule indicated in its associated one of the local programs, send a first message to a first of the interface circuits identifying a first of the processors, wherein the first of the interface circuits is associated with a first of the interfaces and is configured to, during a first one of phases of execution of the computer program, and in response to receipt of the first message, control its associated switching circuitry to connect to a first of the at least some of the buses so as to enable reception, at the first of the interfaces, of a first set of one or more egress data packets from the first of the processors, wherein the first of the processors is associated with the first of the at least some of the buses, wherein one of the plurality of processors is configured to, in dependence upon a schedule indicated in its associated one of the local programs, send a second message to a second of the interface circuits identifying the first of the processors, wherein the second of the interface circuits is associated with a second of the interfaces and is configured to, during a second one of the phases of execution of the computer program, and in response receipt of the second message, control its associated switching circuitry to connect to the first of the at least some of the buses so as to enable reception, at the second of the interfaces, of a second set of one or more egress data packets from the first of the processors.

Each of the processors is associated with a different bus on which it outputs its data. By 'listening' to a selected one of the buses, the interface circuitry enables its interfaces to receive data from a selected one of the processors. The interface circuitry is responsive to control information messages that are provided by at least one of the processors to connect to the appropriate processor to enable that processor to send data over its associated interface. Since the control information is provided by the local programs of the processors, the association between processors and interfaces for the output of egress data is controlled based on the local programs. In this way, the connectivity of the device (i.e. which of its processors connect to which of the interfaces) is not fixed by the physical hardware, but is controlled based on the code loaded into the processors and may change at runtime during execution of those local programs.

According to a third aspect, there is provided a method implemented in a data processing device, the method comprising: storing in each of a plurality of processors, a local program that is associated with the respective processor, the local programs of the processors together providing at least part of a computer program, wherein each of at least some of the local programs comprises a schedule defining, for different phases of execution of the computer program, which of a plurality of interfaces of the data processing device its associated one of the processors is scheduled to connect to; receiving via the plurality of interfaces, a plurality of ingress data packets; on each of at least some of a plurality of buses of a switching fabric, transporting ones of the ingress data packets received on a respective one of the interfaces that is associated with the respective bus; in dependence upon the schedule of at least one of the local programs associated with at least one of the processors: controlling switching circuitry associated with the at least one of the processors to, during a first of the phases of execution of the computer program, connect to a first of the at least some of the buses so as to enable reception, at the least one of the processor, of a first set of the ingress data packets from a first of the interfaces that is associated with the first of the at least some of the buses; and controlling the switching circuitry associated with the at least one of the processors to, during a second of the phases of execution of the computer program, connect to a second of the at least some of the buses so as to enable reception, at the at least one of the processors, of a second set of the ingress data packets from a second of the interfaces that is associated with the second of the at least some of the buses.

In some embodiments, the method comprises: receiving at the second of the interfaces, a third set of ingress data packets during the first of the phases of execution of the computer program; controlling the switching circuitry associated with the at least one of the processors to, during the first of the phases of execution of the computer program, connect to the second of the at least some of the buses so as to enable reception of the third set of the ingress data packets from the second of the interfaces.

In embodiments, the method comprises, the first one of the processors, for each of the first set of the ingress data packets: checking a destination identifier in the respective data packet; if the destination identifier indicates that the respective data packet is for delivery to the first one of the processors, accepting the respective data packet; and if the destination identifier indicates that the respective one of the ingress data packets is not for delivery to the first one of the processors, do not accept the respective data packet.

In some embodiments, the first of the interfaces is associated with a first set of the processors for the first of the phases of execution, wherein the method comprises: each of the first set of the processors, in dependence upon the schedule in its associated one of the local programs, controlling its associated switching circuitry to, during the first of the phases of execution of the computer program, connect to the first of the at least some of the buses so as to enable reception of the first set of the ingress data packets from the first of the interfaces; and for each of the first set of the ingress data packets: checking a destination identifier in the respective data packet; if the destination identifier indicates that the respective data packet is for delivery to that respective one of the first set of the processors, accepting the respective data packet; and if the destination identifier indicates that the respective data packet is not for delivery to that respective one of the first set of the processors, not accepting the respective data packet.

In some embodiments, the plurality of interfaces enable egress data packets output by the plurality of processors to be sent to the external devices, wherein the plurality of buses comprises a second set of busses in addition to the at least some of the buses, each of the second set of buses being associated with one of the processors, the method comprises, on each of the second set of buses, transporting ones of the egress data packets output by its associated one of the processors, wherein the data processing device comprises, for each of the plurality of interfaces, switching circuitry associated with the respective interface and interface circuitry associated with the respective interface, wherein the method comprises, for each of the plurality of interfaces, the respective interface circuitry controlling the respective switching circuitry to connect the respective interface to a respective selected one of the second set of buses to enable sending of at least one of the egress data packets over the respective interface.

In some embodiments, for each of the plurality of interfaces, the respective interface circuitry selecting the respective selected one of the second set of the buses in response to control information received from a further at least one of the processors.

In some embodiments, wherein for each of the plurality of interfaces: the respective control information comprises an identifier of the respective one of the processors associated with the respective selected one of the second set of the buses.

In some embodiments, for the at least one of the plurality of processors: the controlling its associated switching circuitry to connect to the first of the at least some of the buses comprises executing a switch control instruction to cause a first input of the associated switching circuitry to be selected, the first input being associated with the first of the at least some of the buses; and the controlling its associated switching circuitry to connect to the second of the at least some of the buses comprises executing a switch control instruction to cause a second input of the associated switching circuitry to be selected, the second input being associated with the second of the at least some of the buses.

According to a fourth aspect, there is a method implemented in a data processing device, the method comprising: storing in each of a plurality of processors, a local program that is associated with the respective processor, the local programs of the processors together providing at least part of a computer program; transporting via each of a least some of a plurality of buses of a switching fabric, ones of egress data packets that are output by one of the processors that is associated with the respective bus; in dependence upon a schedule indicated in one of the local programs, sending a first message to a first of a plurality of interface circuits associated with a first of a plurality of interfaces of the data processing device, the first message identifying a first of the processors; during a first one of a plurality of phases of execution of the computer program, and in response to receipt of the first message, controlling switching circuitry associated with the first of the interfaces to connect to a first of the at least some of the buses so as to enable reception, at the first of the interfaces, of a first set of the egress data packets from the first of the processors, wherein the first of the processors is associated with the first of the at least some of the buses; in dependence upon a schedule indicated in one of the local programs, sending a second message to a second of the interface circuits associated with a second of the plurality of interfaces, the second message identifying the first of the processors; during a second one of the phases of execution of the computer program, and in response to receipt of the second message, controlling the switching circuitry associated with the second of the interfaces to connect to the first of the at least some of the buses so as to enable reception, at the second of the interfaces, of a second set of the egress data packets from the first of the processors.

In some embodiments, the one of the local programs that causes the sending of the first message is different to the one of the plurality of processors that causes the sending of the second message.

In some embodiments, the one of the local programs that causes the sending of the first message is the same as the one of the plurality of processors that is configured to send the second message.

In some embodiments, the method comprises the first of the interface circuits receiving the first message by controlling its associated switching circuitry to connect to one of the buses that is associated with the one of the plurality of processors that sends the first message; and the second of the interface circuits receiving the second message by controlling its associated switching circuitry to connect to one of the buses that is associated with the one of the plurality of processors that sends the second message.

In some embodiments, the first of the interface circuits performs the controlling of its associated switching circuitry to connect to the one of the buses that is associated with the one of the plurality of processors that sends the first message in response to receipt of an earlier message during one of the phases of execution of the computer program that precedes the first of the phases of execution of the computer program.

In some embodiments, the method comprises the first of the interface circuits performing the controlling of its associated switching circuitry to connect to the one of the buses that is associated with the one of the plurality of processors that sends the first message in response to a stored indication in the first of the interface circuits that the one of the plurality of processors that sends the first message has a fixed association with the first of the interface circuits.

In some embodiments, wherein the switching fabric comprises a further set of buses, each of which is associated with one of the interface circuits, the method comprising, on each of the further set of buses, transporting data output by its associated one of the interface circuits.

In some embodiments, for each of at least one of the further set of buses, the transported data comprises control information output by the associated one of the interface circuits, wherein the method comprises: during the first one of the phases of execution, a first of the processors, controlling its associated switching circuitry to connect to one of the further set of buses that is associated with the first of the interface circuits; and outputting the first set of the one or more egress data packets, in response to the receipt of a first of the control messages from the first of the interface circuits via the one of the further set of buses.

In some embodiments, the first of the control messages identifies the first of the processors, wherein the first of the interface circuits is configured to output the first of the control messages in response to receipt of the first message.

In some embodiments, for each of the further set of buses, the transported data comprises ingress data received from at least one of the external devices, wherein the first of the interface circuits is associated with a set of processors, wherein each of the set of processors is configured to control its associated switching circuitry to connect to a first of the further set of buses that is associated with the first of the interface circuits so as to receive some of the ingress data from the first of the interface circuits.

In some embodiments, each of the buses of the switching fabric comprises a plurality of pipeline stages and is configured to transport data in a number of clock cycles that is fixed for a given number of pipeline stages traversed by that data.

In some embodiments, the different phases of execution are exchange phases, wherein the plurality of processors are configured to alternate between operation in compute phases and the exchange phases, the compute phases and the exchange phases being separated by barrier synchronisations enforced between at least some of the processors.

In some embodiments, the data processing device is a chip.

According to a fifth aspect, there is providing a computer program comprising a plurality of local programs, each of the local programs being associated with one of a plurality of processors, wherein each of the local programs when executed on one its associated one of the plurality of processors, causes a method according to the third and/or fourth aspect or any embodiment thereof to be performed.

According to a sixth aspect, there is provided a non-transitory computer readable medium storing a computer program according to the fifth aspect.

BRIEF DESCRIPTION OF DRAWINGS

To aid understanding of the present disclosure and to show how embodiments may be put into effect, reference is made by way of example to the accompanying drawings in which:

FIG. 3 illustrates the compute and exchange phases between which tiles in the processing unit may alternate;

DETAILED DESCRIPTION

Embodiments relate to a processing device comprising a plurality of processors. In embodiments, the processing device may comprise a multi-tile processing unit, in which each of the processors is a tile.

Figure 1:
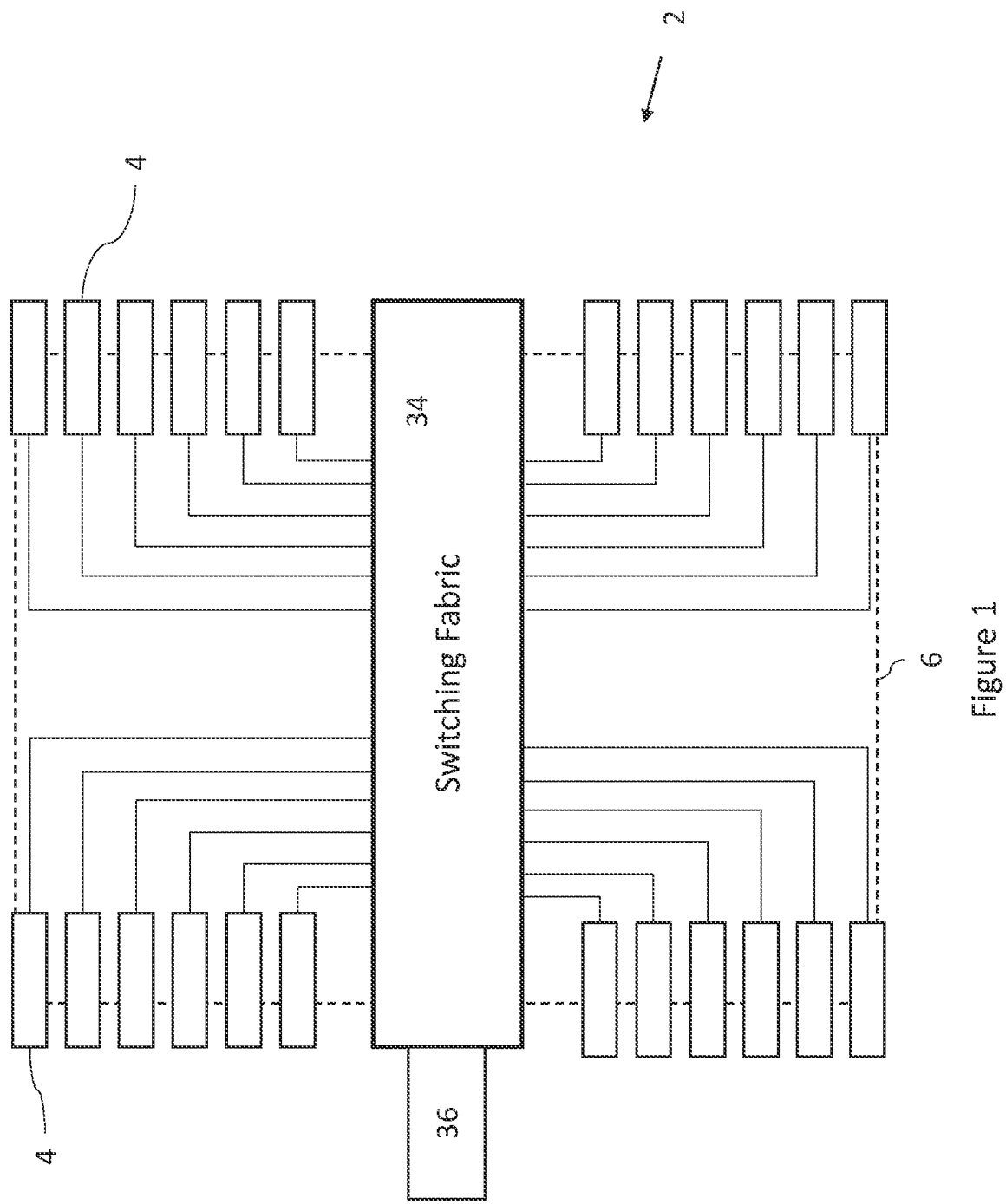
FIG. 1 is a schematic block diagram of a multi-tile processing unit.

Reference is made to FIG. 1, which illustrates an example multi-processing unit 2. The processing unit 2 may be an Intelligence Processing Unit (IPU) that is described in our earlier U.S. application Ser. No. 15/886,065, the contents of which are incorporated by reference. Each of the IPUs is formed on a separate integrated circuit (i.e. a chip).

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 is part of a chip that also comprises one or more external links, enabling the processing unit 2 to be connected to one or more other processing units (e.g. one or more other instances of the same processing unit 2). These external links may comprise any one or more of: one or more processing unit-to-host links for connecting the processing unit 2 to a host system, and/or one or more processing unit-to-processing unit links for connecting together with one or more other instances of the processing unit 2 on the same IC package or card, or on different cards. The processing unit 2 receives work from the host, in the form of application data which it processes.

Figure 2:
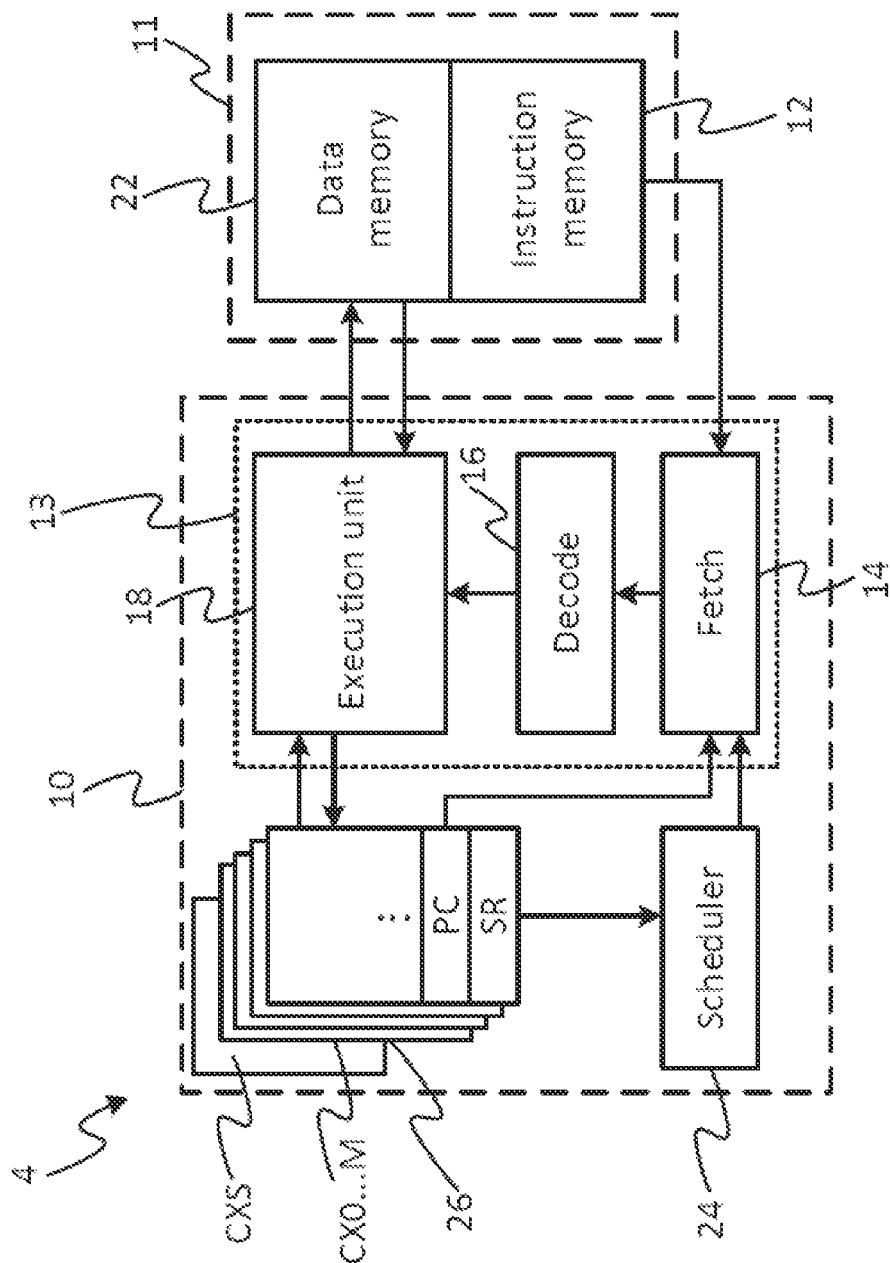
FIG. 2 is a schematic block diagram of one of the tiles that may be implemented in the multi-tile processing unit.

Each of the processors 4 comprises processing circuitry and memory. In some example embodiments, the processing circuitry is a multi-threaded processor 10. FIG. 2 illustrates an example of a processor 4 in accordance with embodiments of the present disclosure. The processor 4 comprises a multi-threaded processor 10 in the form of a barrel-threaded processor 10, and a local memory 11. A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10, multiple different ones of the threads from the instruction memory 12 can be interleaved through a single execution pipeline 13 (though typically only a subset of the total threads stored in the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads;

and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Referring back to FIG. 1, the interconnect 34 is configured to enable the different processors 4 in the array 6 to communicate with one another. However, as well as there potentially being dependencies between threads on the same processor 4, there may also exist dependencies between the portions of the program running on different processors 4 in the array 6. A technique is therefore required to prevent a piece of code on one processor 4 running ahead of data upon which it is dependent being made available by another piece of code on another processor 4. This is achieved using a data consistency model.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and an external storage. Typically used data consistency models are Bulk Synchronous Parallel (BSP), Stale Synchronous Parallel (SSP) and Asynchronous. The processing unit 2 described herein uses a BSP model, but it will be apparent that the other sync models could be utilised as an alternative.

Figure 4:
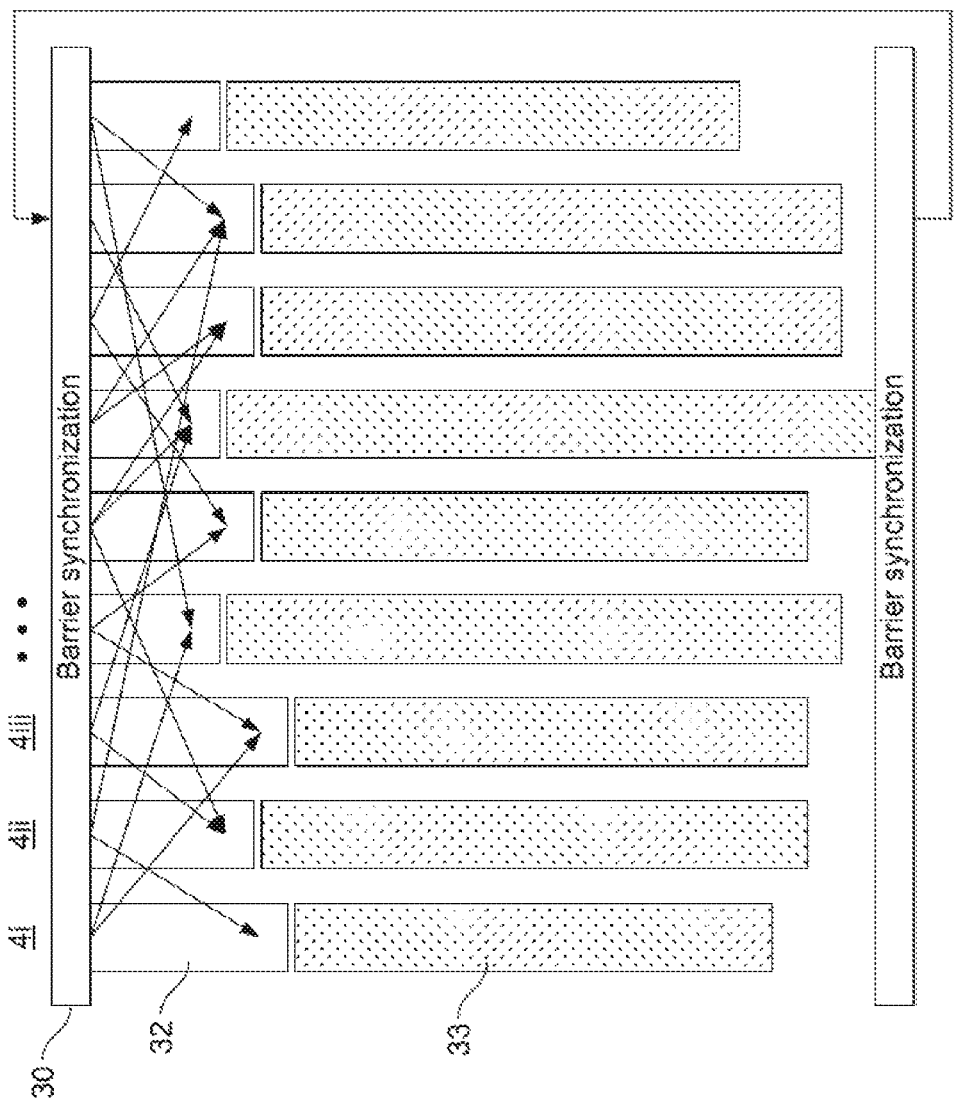
FIG. 4 is a schematic illustration of a bulk synchronous parallel (BSP) computing model in which processors of a processing device alternate between a compute phase and an internal exchange phase.

Reference is made to FIGS. 3 and 4, which illustrate an implementation of a BSP exchange scheme in which each processor 4 performs a compute phase 33 and an exchange phase 32 in an alternating cycle, separated from one to the other by a barrier synchronization 30 between processors. In the case illustrated by FIGS. 2 and 3, a barrier synchronization is placed between each compute phase 33 and the following exchange phase 32. During the compute phase 33, each processor 4 performs one or more computation tasks locally, but does not communicate any results of these computations with any others of the processors 4. In the exchange phase 32, each processor 4 is allowed to exchange one or more results of the computations from the preceding compute phase to and/or from one or more others of the processors 4, but does not perform any new computations until it has received from other processors 4 any data on which its task(s) has/have dependency. Neither does it send to any other processor 4, any data except that computed in the preceding compute phase. It is not excluded that other operations such as internal control-related operations may be performed in the exchange phase 32.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all processors 4 are required to complete their respective compute phases 33 before any in the group is allowed to proceed to the next exchange phase 32, or (b) all processors 4 in the group are required to complete their respective exchange phases 32 before any processor in the group is allowed to proceed to the next compute phase 33, or (c) both of these conditions are enforced. In all three variants, it is the individual processors 4 which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep). Each group of processors 4 participating in the same barrier synchronisation is referred to herein as a 'synchronisation group'.

Note that it not a requirement for all of the processors 4 of the processing unit 2 to participate in a barrier synchronisation that involves some of the processors 4 of the processing unit 2. In some cases, multiple different independent groups of processors 4 on the same processing unit 2 or different processing units 2 each form a separate respective BSP group operating asynchronously with respect to one another, with the BSP cycle of compute, synchronize and exchange being imposed only within each given group, but each group doing so independently of the other groups.

FIG. 4 illustrates the BSP principle as implemented amongst a group 4i, 4ii, 4iii of some or all of the processors 4 in the array 6, in the case which imposes: (a) a barrier synchronization from compute phase 33 to exchange phase 32 (see above). Note that, in this arrangement, some processors 4 are allowed to begin computing 33 whilst some others are still exchanging.

The BSP model is used for exchange of data between processors 4 on the processing unit 2. The communication between processors 4 of a processing unit 2 occurs in time deterministic fashion in which data packets are transmitted without headers as in our earlier application U.S. patent application Ser. No. 15/886,315. Additionally, the BSP model may also be used for the exchange of data between processing units 2 or other external entities, e.g. a host device or memory module. Such an exchange of data between processors 4 of a processing unit 2 and an external entity is referred to as an external exchange 50'.

Figure 5:
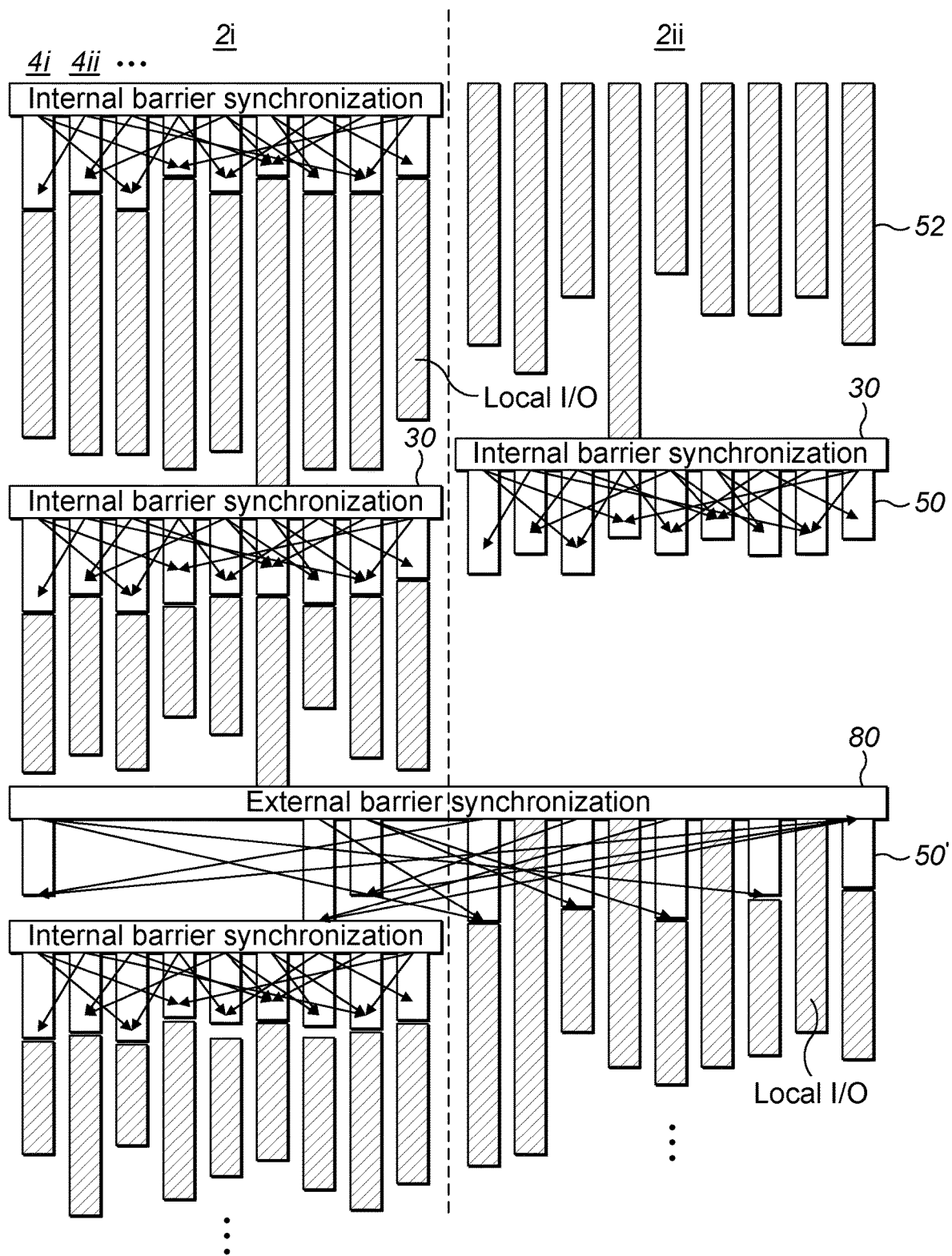
FIG. 5 illustrates a schedule according to the bulk synchronous parallel (BSP) computing model, including internal and external barrier synchronisations.

Reference is made to FIG. 5, which illustrates an example BSP program flow involving both internal (on-chip) and external (inter-chip) synchronizations. As shown, the flow comprises internal exchanges 50 (of data between processors 4 of the same processing unit 2) and an external exchange 50' (of data between processors 4 of different processing units 2). The program flow in FIG. 5 illustrates a program flow for a first processing unit 2i and a second processing unit 2ii.

As illustrated in FIG. 5, the internal BSP supersteps (comprising the internal exchanges 50 of data between processors 4 on the same chip 2) are kept separate from the external sync and exchange (comprising the external exchanges 50' of data between processors 4 of different processing units 2).

The program may be arranged to perform a sequence of synchronizations, exchange phases and compute phases comprising, in the following order: (i) a first compute phase, then (ii) an internal barrier synchronization 30, then (iii) an internal exchange phase 50, then (iv) an external barrier synchronization 80, then (v) an external exchange phase 50'. The external barrier 80 is imposed after the internal exchange phase 50, such that the program only proceeds to the external exchange 50' after the internal exchange 50. Note also that, as shown with respect to processing unit 2i in FIG. 5, optionally a compute phase may be included between internal exchange (iii) and external barrier (iv).

This overall sequence is enforced by the program (e.g. being generated as such by the compiler). In embodiments, the program is programmed to act in this way by means of a SYNC instruction executed by the processors 4. The internal synchronization and exchange does not extend to any processors or other entities on another chip 2. The sequence (i)-(v) (with the aforementioned optional compute phase between iii and iv) may be repeated in a series of overall iterations. Per iteration there may be multiple instances of the internal compute, sync and exchange (i)-(iii)

prior to the external sync & exchange. I.e. multiple instances of (i)-(iii) (retaining that order), i.e. multiple internal BSP supersteps, may be implemented before (iv)-(v), i.e. the external sync and exchange. Note also, any of the processors 4 may each be performing their own instance of the internal synchronization and exchange (ii)-(iii) in parallel with the other processors 4.

Thus per overall BSP cycle (i)-(v) there is at least one part of the cycle (ii)-(iii) wherein synchronization is constrained to being performed only internally, i.e. only on-chip.

Note that during an external exchange 50, the communications are not limited to being only external: some processors 4 may just perform internal exchanges, some may only perform external exchanges, and some may perform a mix.

Also, as shown in FIG. 5, some processors 4 may perform local input/output during a compute phase. For example, they may exchange data with a host or other type of external storage.

Note also that, as shown in FIG. 5, it is in general possible for any or all processors to have a null compute phase 52, a null exchange phase 50 or both, in any given BSP superstep.

Each of the barrier synchronisation shown in FIG. 5 is passed by the processors 4 once an exchange of sync requests and acknowledgments has completed. For an internal barrier synchronisation, each processor 4 in the synchronisation group, once it reaches an internal barrier synchronisation, sends an internal sync request to the internal synchronisation controller 36. When the internal synchronisation controller 36 has received sync requests from all of the processors 4 that are part of the synchronisation group, the sync controller 36 returns sync acknowledgments to each of the processors 4. Upon receiving the sync acknowledgments, each of the processors 4 then enters the exchange phase in which data exchange between the processors 4 occurs. This technique ensures that each processor 4 must reach the barrier before any of the processors 4 can progress to the exchange phase.

For an external exchange, each of the processors 4 of the processing unit 2 that is participating in the external barrier synchronisation, once it reaches that external barrier synchronisation, issues an external sync request to external sync logic (not shown in FIG. 1) that is associated with the processing unit 2. Once the external sync logic has received a sync request from all of the processors 4 of the processing unit 2 that belong to the sync group, it either acknowledges those sync requests or propagates a sync request to a further entity. The further entity could be a proxy for exchanging data with a host system or external sync logic associated with another processing unit 2.

When a sync request is propagated to external sync logic associated with another processing unit 2, the action taken by that external sync logic in response to the sync request depends upon whether the logic is defined as the master for the sync group or as a propagation node for that group. The propagation nodes propagate their received sync requests towards the master defined for the sync group. The sync master, once it has received external sync requests for each of the processing units 2 that are part of the sync group, returns sync acknowledgments to the external sync logic associated with each of the other processing units 2 in the sync group. The sync master also returns sync acknowledgments to each of the processors 4 in its own processing unit 2. Each external sync logic (i.e. the propagation nodes) of the other processing unit 2 in the sync group, upon receiving a sync acknowledgment, returns sync acknowledgments to the processors 4 of its processing unit 2. In response to receiving the sync acknowledgements, the processors 4 pass the barrier synchronisation and exchange data with processors 4 of the other processing units 2 of the sync group during the external exchange phase.

Figure 6A:
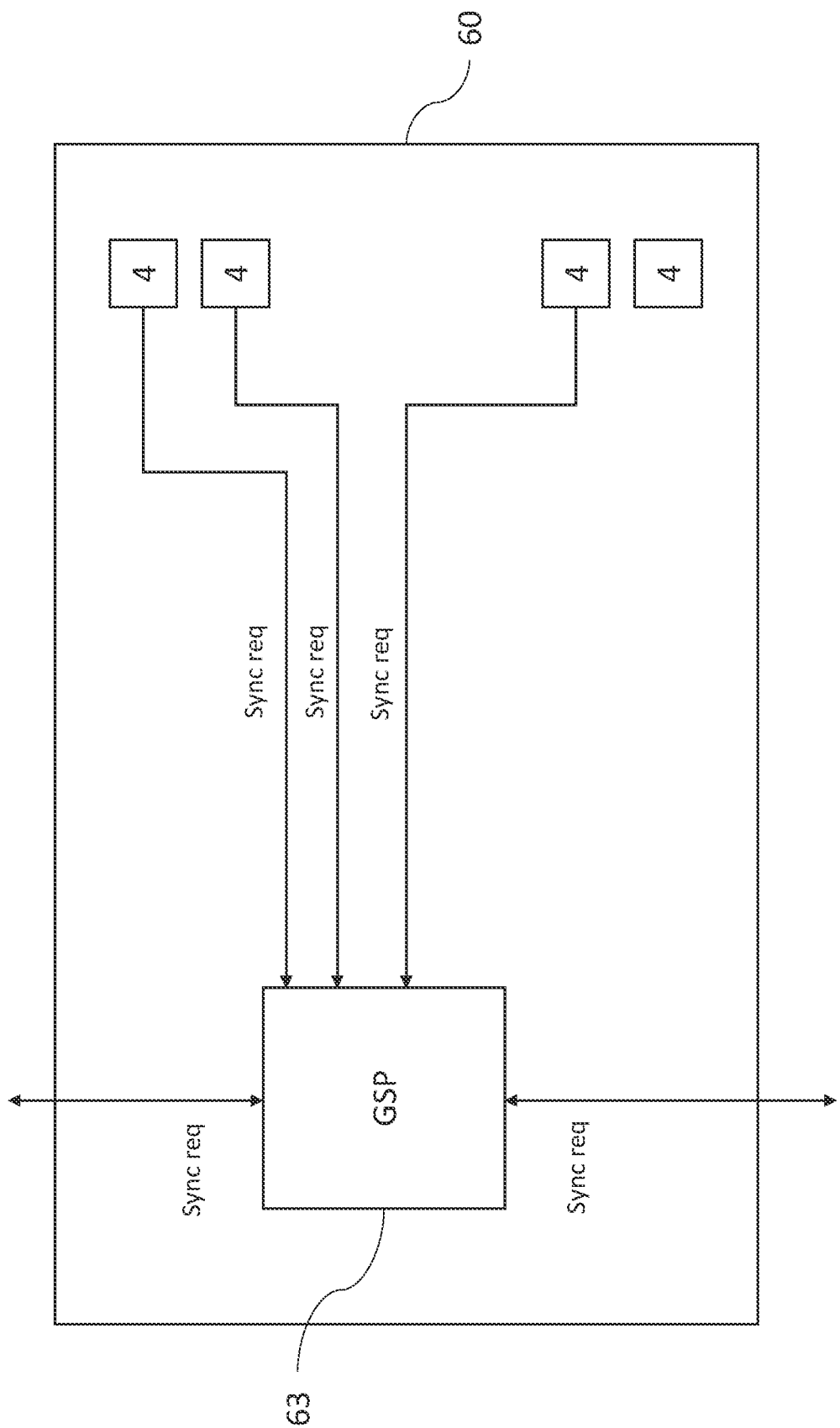
FIG. 6A illustrates the exchange of sync requests for coordinating a barrier synchronisation.
Figure 6B:
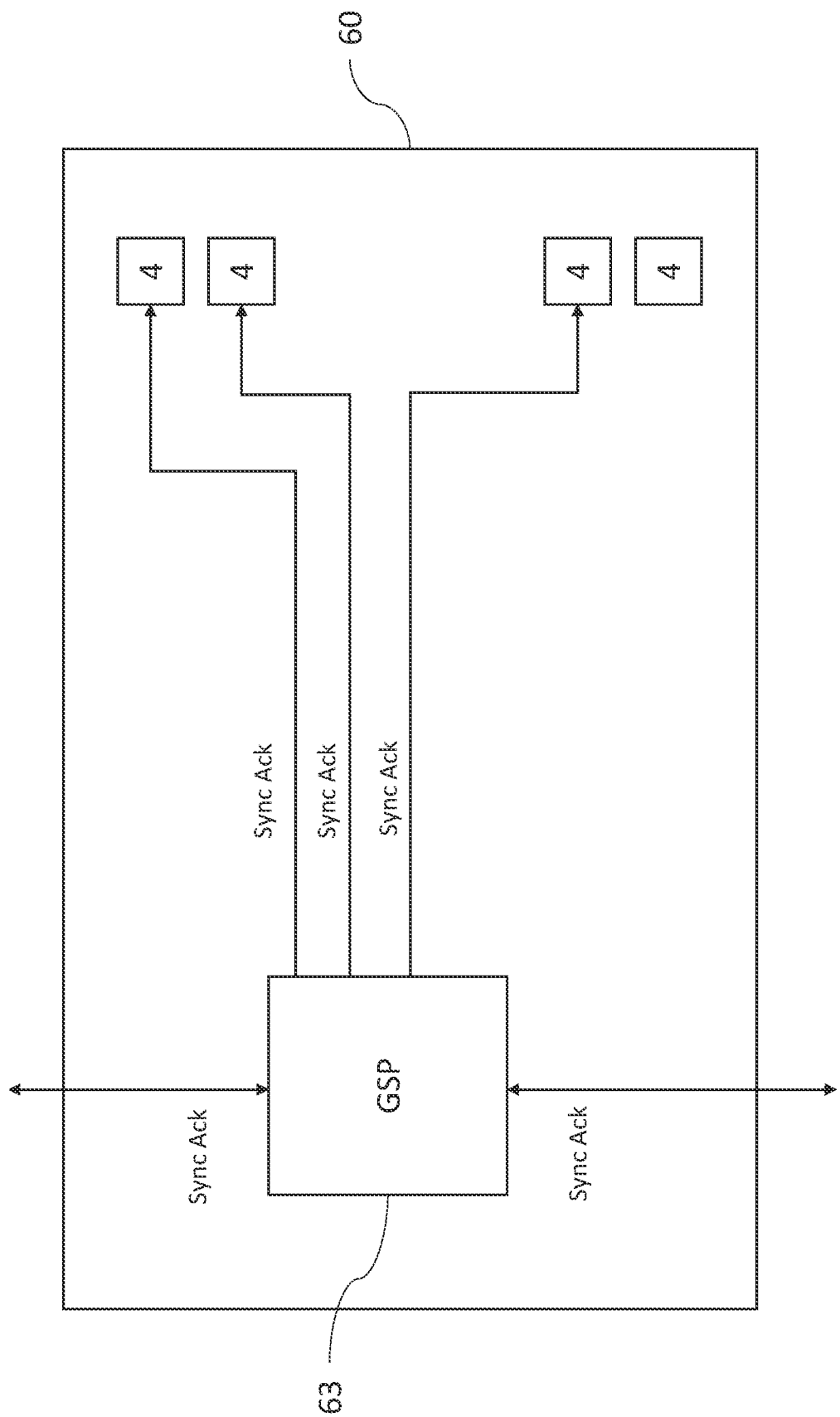
FIG. 6B illustrates the exchange of sync acknowledgments for coordinating a barrier synchronisation.

Reference is made to FIGS. 6A and 6B, which illustrates the exchange of sync requests and acknowledgements, performed in order to co-ordinate an external barrier synchronisation. The processors 4 of the processing unit 2 belong to a device 60. In embodiments, this device 60 is an integrated circuit (i.e. a chip). The device includes the external sync logic 63. The external sync logic 63 may be referred to as the global sync peripheral (GSP).

Although only four tiles 4 are shown in FIGS. 6A and 6B. However, it would be appreciated that the device 60 in practice would likely contain many more. In the example barrier synchronisation for which the exchange of sync/acks is illustrated, three of the four tiles 4 belong to the synchronisation group.

As shown in FIG. 6A, when each processor 4 in the sync group reaches an external barrier sync, it executes a sync instruction, which causes it to issue a sync request to the GSP 63. The action taken by the GSP 63, after having received all of the sync requests from the tiles 4 of the device 60 that belong to the relevant sync group defined for the sync, depends upon whether the GSP 63 is defined as the master node for the sync group or the propagation node for the sync group. If the GSP 63 is the master node, the GSP 63 waits until it receives all of the expected sync requests from the downstream nodes in the sync network before transmitting sync acknowledgments. If the GSP 63 is the sync propagation node, after having received the sync requests from all of the tiles 4 on the device 60 belonging to the sync group, the GSP 63 transmits one or more sync requests upstream towards the master node. The downstream nodes and/or master nodes may be the GSPs on other multi-processor devices.

As shown in FIG. 6B, the GSP 63 transmits sync acknowledgments to all of the processors 4 in the sync group. If the GSP 63 is defined as the master node, it transmits the sync acknowledgments after receiving sync requests from all downstream nodes. In this case, the GSP 63 sends sync acknowledgments to other nodes (e.g. other GSPs) external to the device 60 as well to processors 4 on device 60. If the GSP 63 is defined as a propagation node, it transmits sync acknowledgments to the processors 4 on device 60 in response to receipt of a sync acknowledgment sent from an upstream node.

In response to receipt of a sync acknowledgment, each processor 4 of the sync group, enters the external exchange phase. In this exchange phase, the participating processors 4 may each send one or more data packets to destinations external to the device 60 and/or may receive one or more data packets from destinations external to the device 60.

According to embodiments, the switching fabric 34 of the device 60 transports data packets in transit between the processors 4 and the interfaces 71 of the device 60. The switching fabric 34 is a stateless fabric, i.e. it has no state that is visible to the program executing on the processors 4. Each of the exchange buses in the fabric 34 is provided by a set of connections wires that is fixed end to end. Each of the wires is a pipelined connection wire comprising a series of temporary stores, e.g. latches, which hold a bit of data for a clock cycle before releasing it to the next store. The switching fabric 34 is fully synchronous and features no flow control. As a result, communication across the switching fabric 34 is time deterministic. In other words, the time of travel along a particular wire of the switching fabric 34 is a determined by the number of temporary stores traversed along that wire, since each store uses up a single clock cycle of time. These features enable the switching fabric 34 to be highly efficient in terms of bandwidth, area, power and latency, as compared to an interconnect featuring queueing and arbitration of data packets. Hence, since the switching fabric 34 does not provide for the routing of packets based on the destination identifiers in the headers of those packets, an alternative approach is required to enable ingress packets received on an external interface to be delivered to the appropriate processor 4, and to enable egress packets output by a processor 4 to be delivered to the appropriate external interface. Embodiments achieve this by the provision of switching circuitry that operates under the control of the compiled code running on the processors 4 to control the movement of data packets between the processors 4 and the external interfaces of the device 60.

Figure 7:
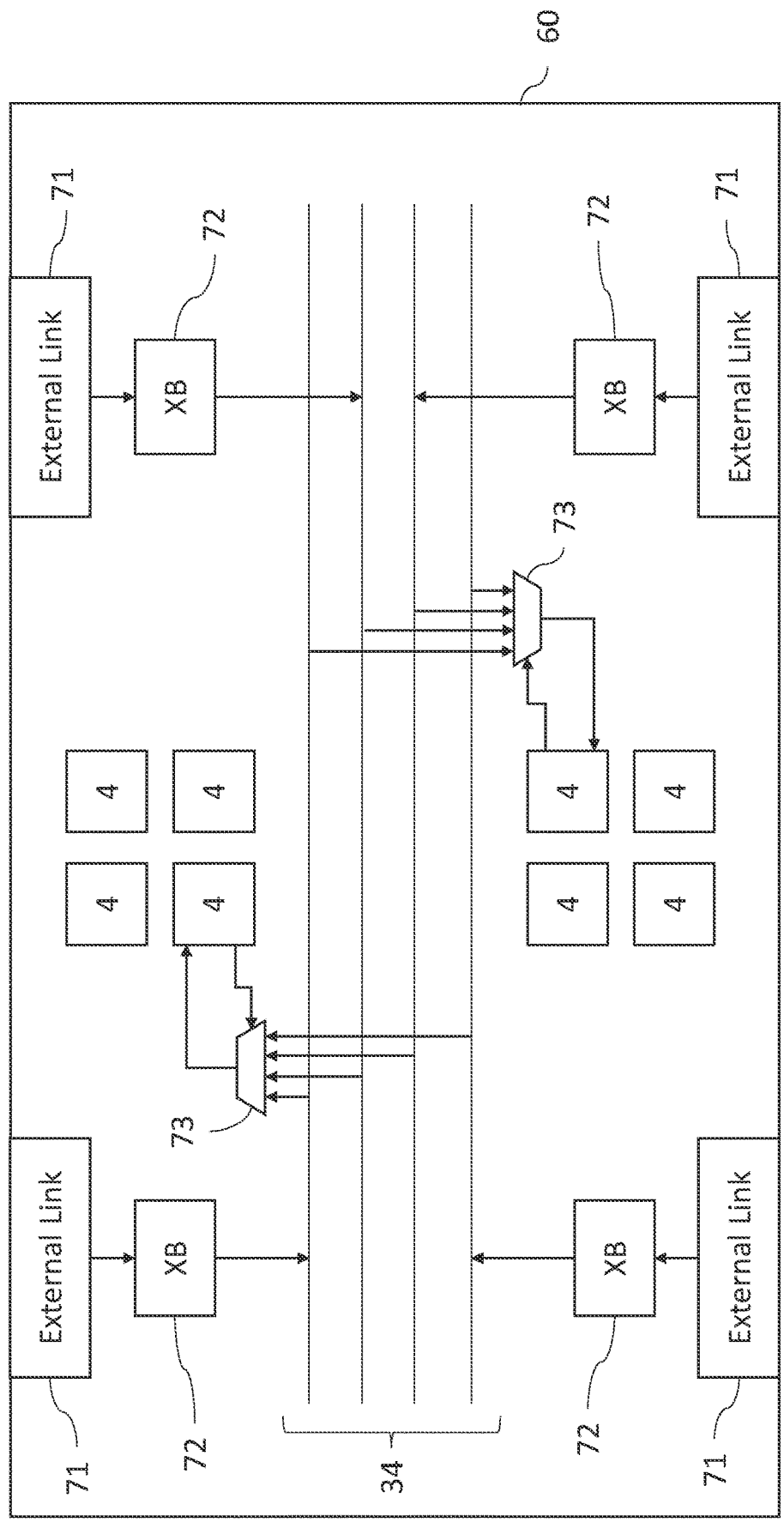
FIG. 7 is a schematic illustration of a device, showing the connections between the processors and the interfaces that enable the processors to receive ingress data packets from external devices.

Reference is made to FIG. 7, which illustrates how ingress data packets received at the processing device 60 are delivered to the processors 4 of the device 60. The 'ingress data packets' or 'ingress data' discussed herein are data packets received on the external interfaces of the device 60 and containing data to be written to memory 11 of one of the processors 4.

The processing device 60 includes multiple external links 71 enabling processors 4 to send and receive data with different external devices. The external links 71 may also be referred to as external interfaces 71. Different ones of the external links 71 connect to different external devices. In example embodiments, the external interfaces 71 comprise circuitry for tunnelling packets over Ethernet to other devices and for receiving Ethernet frames and extracting the packets. In embodiments, each of the interfaces 71 also comprises a SerDes (Serialiser/Deserialiser) for sending and receiving the Ethernet frames over a serial link. Each of the links 71 is associated with interface circuitry 72, which is referred to herein as an exchange block 72 (XB 72). Each XB 72 receives data packets from its associated interface 71. These data packets are received at the XB 72 from its associated interface 71 in a first packet format (referred to herein as the Elink packet format). Each XB 72 performs processing of the Elink packets to convert them to a second packet format (referred to herein as the Tlink packet format). The XBs 72 output the Tlink packets to the switching fabric 34 for delivery to their destination processors 4.

Each of the XBs 72 has an associated bus in the switching fabric 34 on which it is configured to output data packets for delivery to ones of the processors 4. Each such bus is referred to herein as an exchange bus. Each exchange bus comprises a set of wires for carrying bits of a data packet in parallel. When an XB 72 has received a data packet from its external interface 71, it outputs that packet onto its associated exchange bus in the switching fabric 34, with that data packet then traversing the bus. In at least some embodiments, the data packet may traverse the bus in both directions.

Each processor 4 has an associated switching circuitry 73 that is controllable by that processor 4 to connect to any of the exchange buses in the switching fabric 34. The switching circuitry 73 takes the form of a multiplexer 73. Although only two multiplexers 73 are shown in FIG. 7, each of the processors 4 in the device 60 has such an associated multiplexer. In order to receive an ingress data packet sent onto the switching fabric 34 by a particular XB 72, the processor 4 controls its associated switching circuitry 73 to select the input of that switching circuitry that connects to that particular XB's exchange bus in the switching fabric 34. The effect of selecting this input is that the processor 4 is connected to the exchange bus of the XB 72. When the data packet sent by the XB 72 traverses the exchange bus, that data packet will be received at the processor 4 that connected to the exchange bus.

Each processor 4 comprises an instruction memory 12 storing a local program. The local program held in each processor 4 comprises a pre-defined schedule that indicates for each external exchange phase, which of the XBs 72, and hence which of the interfaces 71, the respective processor 4 will connect to so as to enable reception of data from that interface 71. When a processor 4 enters an external exchange phase following a barrier synchronisation, the processor 4 issues a multiplexer select signal to its multiplexer 73 to select one of the inputs that is associated with the XB 72 that, as specified in its local program, it is arranged to connect to during that external exchange phase.

Figure 8:
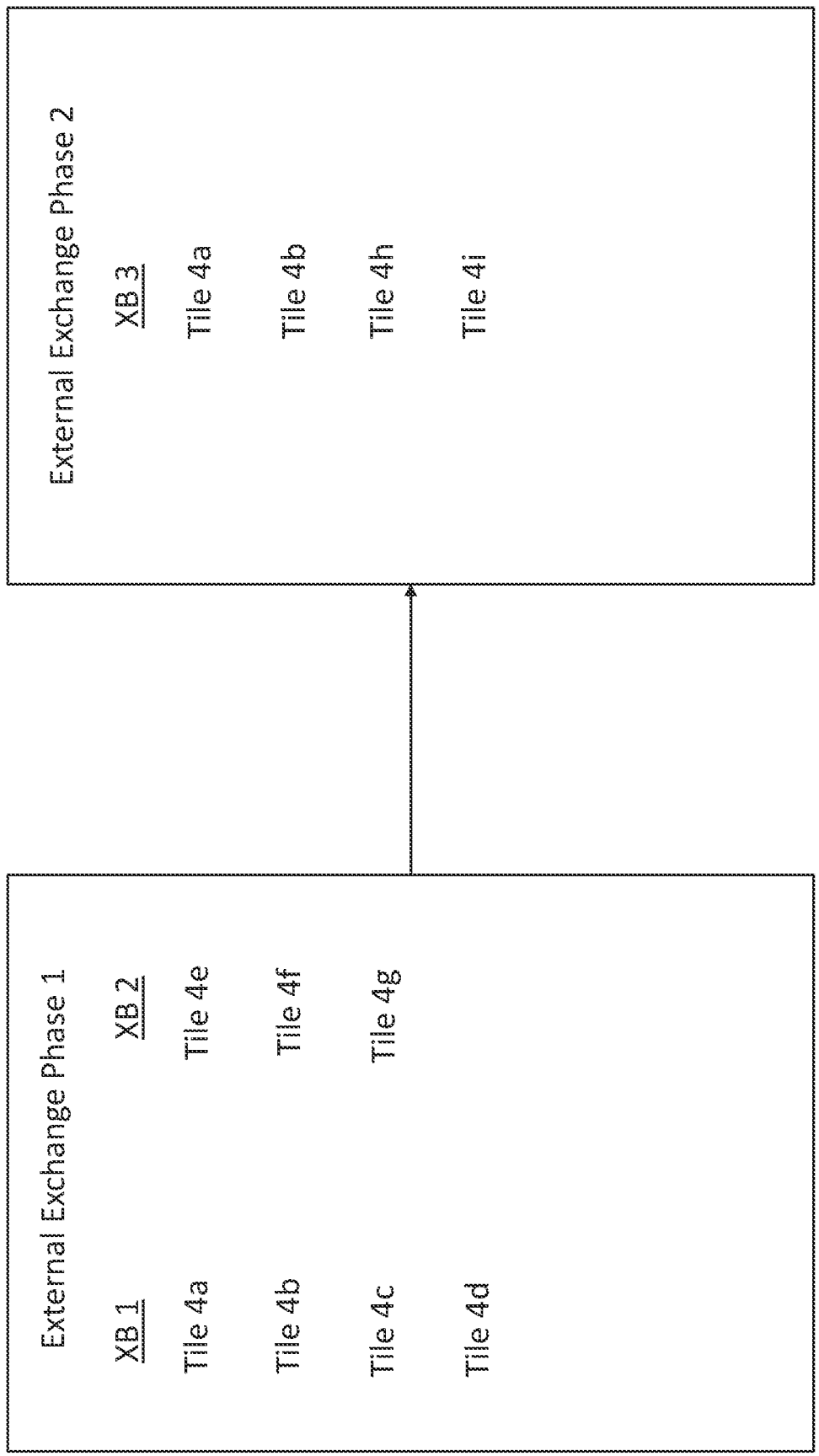
FIG. 8 illustrates an example of the grouping of processors into different sets associated with different exchange blocks during different external exchange phases.

Reference is made to FIG. 8, which illustrates an example of the association of different ones of a group of processors 4a-4i with different XBs 72 during two different external exchange phases. These changing associations result from the schedules specified by the compiled code of the local programs running in each processor 4. Each of these processors 4a-4i is operable to receive data in the manner from an XB 72 described above with respect to FIG. 7.

As shown, processors 4a-g are scheduled to participate in a first external exchange phase (External Exchange Phase 1). These processors 4a-g form a sync group and are configured to participate together in the same barrier synchronisation. During this first external exchange phase, the remaining processors 4 of the device 60 may be performing computations as part of a compute phase or may be participating in a different external exchange phase that is not represented in FIG. 8. A first subset of the processors 4a-d are associated with a first XB 72 (labelled as XB 1) for the first external exchange phase. Each processor of this first subset of processors 4a-4d executes a switch control instruction to control its associated switching circuitry 73 to connect to the exchange bus that is associated with XB 1. During the external exchange phase, XB 1 receives a number of ingress data packets via its associated interface 71 and outputs these on to its exchange bus in the switching fabric 34. Each of the ingress data packets traverses the exchange bus and is received at the processors 4a-4d, which are connected to the exchange bus. Each of the ingress data packets comprises a header identifying one of the processors 4a-4d as its destination processor 4. Circuitry in each of the processors 4a-4d, upon receipt of each the ingress data packets from XB 1, checks this destination identifier, and if the destination identifier matches the identifier of its processor 4, accepts the ingress data packet. If the destination identifier does not match the identifier of its processor, the circuitry of the processor 4 discards the ingress data packet.

Also for the first external exchange phase, a second subset of processors 4e-g are associated with a second XB 73 (labelled as XB 2). Each processor of this second subset of processors 4e-4g executes a switch control instruction to control its associated switching circuitry 73 to connect to the exchange bus that is associated with XB 2. During the external exchange phase, XB 2 receives a number of ingress data packets via its associated interface 71 and outputs these on to its exchange bus in the switching fabric 34. Each of the ingress data packets will be received at the processors 4e-4g, which are connected to the exchange bus of XB 2. Each of the ingress data packets comprises a header identifying one of the processors 4e-4g as its destination processor 4. Circuitry in each of the processors 4e-4g, upon receipt of each of the ingress data packets from XB 2, checks this destination identifier, and if the destination identifier matches its own processor identifier, accepts the ingress data packet. If the destination identifier does not match the processor identifier, the circuitry of the processor 4 discards the ingress data packet.

Following the first external exchange phase, a third subset of processors 4a,b,h,i participates in a second external exchange phase. The third subset of processors 4a,b,h,i forms a sync group for a second barrier synchronisation, with these processors 4a,b,h,i being configured to participate together in the second barrier synchronisation prior to the second external exchange phase.

This third subset of the processors 4a,b,h,i are associated with a third XB 73 (labelled as XB 3) for the second external exchange phase. Each of this third subset of processors 4a,b,h,i executes an instruction to control its associated switching circuitry 73 to connect to the exchange bus that is associated with XB 3. During the external exchange phase, XB 3 receives a number of ingress data packets via its associated interface 71 and outputs these on to its exchange bus in the switching fabric 34. Each of the ingress data packets will be received at the processors 4a,b,h,i, which are connected to the exchange bus of XB 3. Each of the ingress data packets comprises a header identifying one of the processors 4a,b,h,i as its destination processor 4. Circuitry in each of the processors 4a,b,h,i, upon receipt of each the ingress data packets from XB 3, checks this destination identifier, and if the destination identifier matches its own processor identifier, accepts the ingress data packet. If the destination identifier does not match the processor identifier, the circuitry of the processor 4 discards the ingress data packet.

It is noted that there are processors (i.e. processors 4a and 4b) that belong to both the first subset of processors 4a-4d and the third subset of processors 4a,b,h,i. In accordance with the schedule in their complied code set, processors 4a and 4b control their switching circuitry 73 to connect to the exchange bus of XB 1 during the first exchange phase and then control their switching circuitry to instead connect to the exchange bus of XB 3 during the second external exchange phase. Hence, the schedule permits the same processors to switch between receiving ingress data packets from different links 71 during different phases of execution of the program. This allows different processors 4 to connect to different sources of data packets that are needed during different phases of execution of the program.

Figure 9:
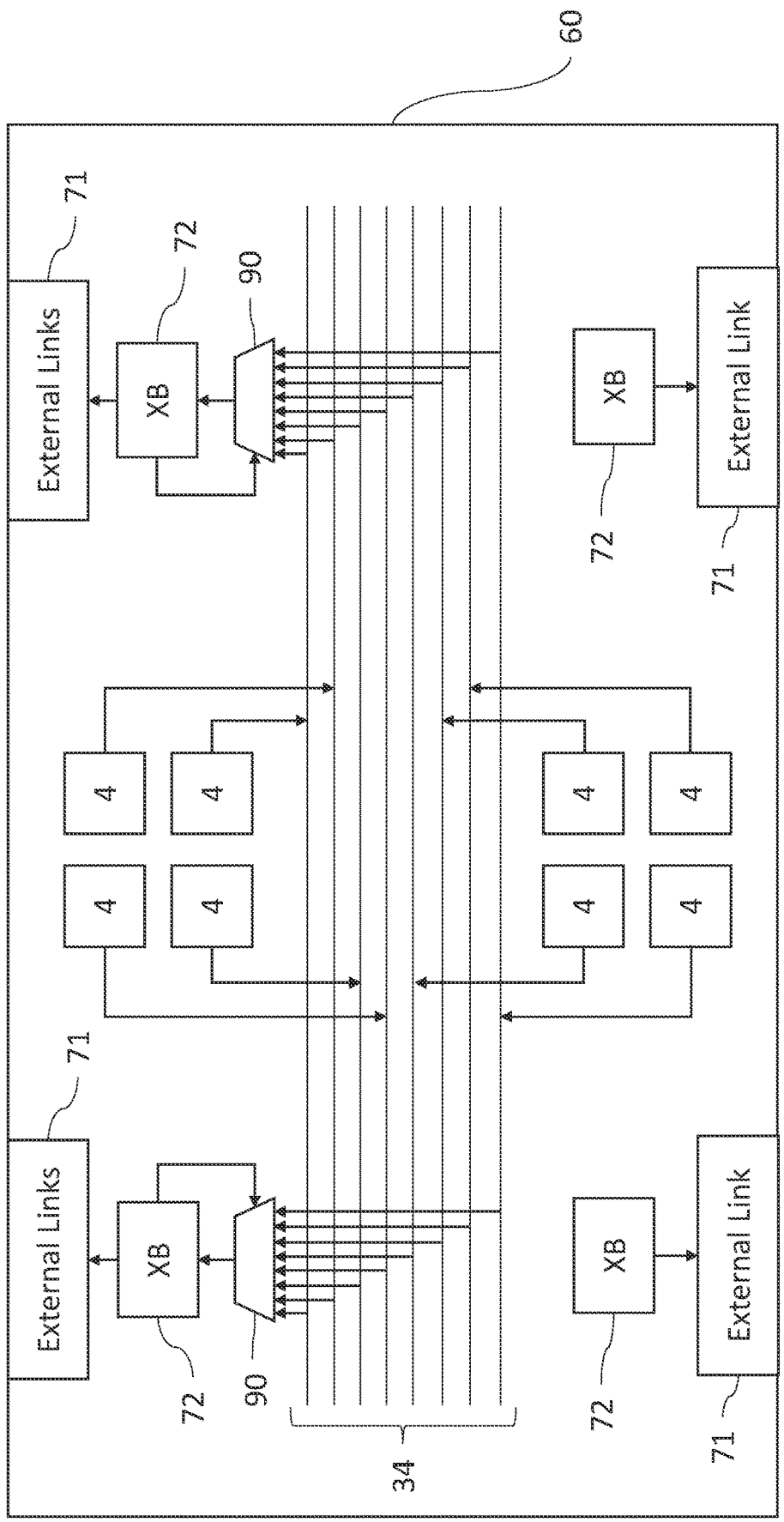
FIG. 9 is a further schematic illustration of the device, showing the connections between the processors and the interfaces that enable the processors to send egress data packets to external devices.

Reference is made to FIG. 9, which illustrates how the processors 4 sends egress data over the external links 71 of the device 60. The 'egress data packets' or 'egress data' discussed herein takes the form of data packets issued by the processors 4 for sending over the external links 71. The egress data packets may take the form of write requests or read requests. For ease of illustration, the switching circuitry 90 and connections to the switching fabric 34 are only shown for two of the interfaces 71. However, it would be appreciated that the other interfaces 71 and XBs 72 also have associated switching circuitry 90 and connections to the switching fabric 34.

Each of the processors 4 has an output bus via which it connects to a corresponding exchange bus in the switching fabric 34. Each processor's exchange bus takes the same form as the exchange buses of the XBs 72 and is operable to transport data packets output by its associated processor 4 in either direction along the switching fabric 34. Each of the processors 4 may output egress data packets for sending over one of the external interfaces 71 during an external exchange phase in which the respective processor 4 participates. These egress data packets are output by the processors 4 in the Tlink packet format.

Each of the XBs 72 has an associated switching circuitry 90 (which takes the form of a multiplexer 90) via which it connects to the switching fabric 34. Each XB 72 is operable to control its associated switching circuitry 90 to connect to a selected one of the exchange buses of the processor 4 in the switching fabric 34. When the input of the switching circuitry 90 of the XB 72 is selected to receive data packets from the exchange bus of a particular processor 4, any data packets sent by that processor 4 will be received at that XB 72. Upon receipt of these egress data packets, the XB 72 converts these data packets from the Tlink packet format to the Elink packet format and causes them to be dispatched over its associated external interface 71.

Each XB 72 is responsive to control information received from ones of the processors 4 during an external exchange phase, the control information indicating to the XB 72 which processor 4 is scheduled to send data over its associated interface 71. In response to this control information, the XB 72 sends a control signal to its switching circuitry 90 to connect to the exchange bus of the processor 4 that is to send the data.

Prior to the start of each external exchange phase, an XB 72 connects to the exchange bus of a processor 4 that is configured to provide initial control information to that XB 72 once the exchange phase begins. The initial control information indicates which of the processors 4 in the device 60 will be the first processor 4 to send data over the interface 71 associated with that XB 72. The processor 4 that provides the initial control information to an XB 72 is referred to herein as the 'master processor 4' for that XB 72. In some embodiments, each XB 72 may have a fixed master processor 4, which always provides the initial control information to that XB 72 for all external exchange phases. In other embodiments, the master processor 4 for an XB 72 may be different for different external exchange phases.

Figure 10:
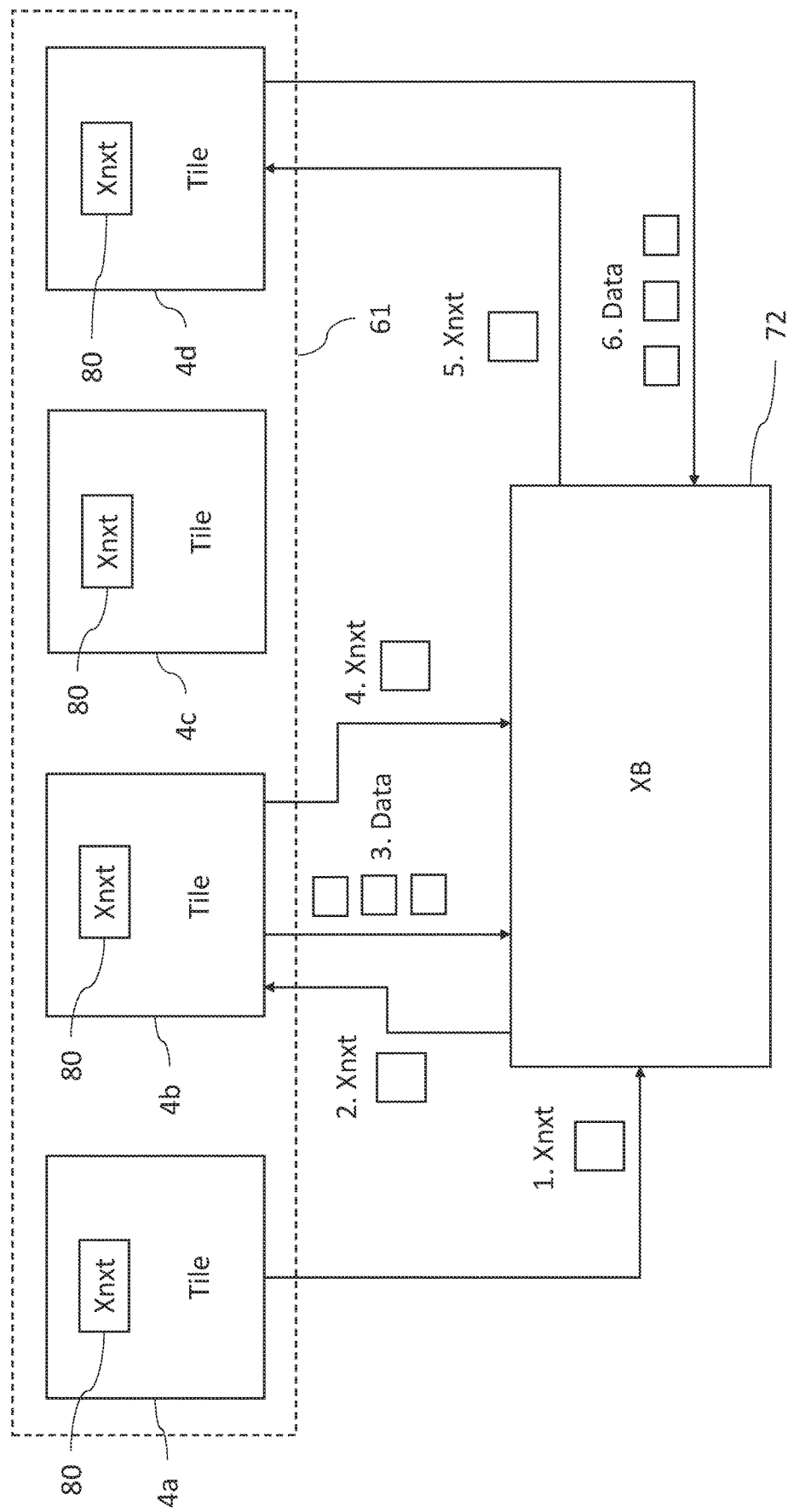
FIG. 10 illustrates an example of the passing of permission between processors associated with an exchange block for a given external exchange phase.

Reference is made to FIG. 10, which illustrates an example as to how the processors 4 may provide the control information to an XB 72 to cause that XB 72 to connect to the exchange bus of the appropriate processor 4. FIG. 10 illustrates a plurality of processors 4a-d. These processors 4a-d form a set of processors 61 that are each associated with the single exchange block 72 for a given external exchange phase. Since all of these processors 4a-d are associated with the XB 72 for this exchange phase, they all control their switching circuitry 73 to connect to the exchange bus of this XB 72, such that the XB 72 may send messages and ingress data packets to the processors 4a-d.

Each of the processors 4 comprises storage 80 for storing indications that are used to control whether that processor 4 is permitted to send data. The storage 80 holds an indication, which may be referred to as 'Xnxt'. The Xnxt indication indicates whether the respective processor 4 has been granted exclusive permission amongst the set 61 of processors 4 to send data.

The Xnxt indication held in a processor 4 is set in response to receipt of a message from the exchange block 72, granting permission for that processor 4 to send data externally to the device 60. When this message is received, processing circuitry of the processor 4 sets the Xnxt indication of that processor 4 to indicate that the processor 4 is granted permission to send data. This message may take the form of a data packet of a type referred to herein as an 'Xnxt packet' or 'Xnxt data packet'.

As a default, the Xnxt indication is set to a state indicating that data sending by the respective processor 4 is not permitted. This indication is updated to indicate that the processor 4 has permission to send data in response to receipt of an Xnxt packet at that processor 4. Only one processor 4 in the set 61 of processors 4 will, at any one time, have its Xnxt indication set to indicate that it has permission to send.

One of the processors 4 in a set 61 of processors 4 is nominated as the master processor. In the example of FIG. 10, processor 4a is the master processor. At the start of the exchange phase, the nominated master processor 4a sends a message to the exchange block 72 indicating which of the processors 4 in the device 60 is to send egress data first. The master processor 4a sends this message in response to executing a master sync instruction, which functions in the same manner as the sync instruction discussed above, but additionally causes the master processor 4a to transmit a single message to the exchange block identifying the first processor 4 to send data externally to the device 60. This message sent by the master processor 4a takes the form of an Xnxt data packet, and is shown in FIG. 10 as "1. Xnxt". The processor 4 identified in such a message may be the master processor 4a itself or one of the other processors 4b, 4c, 4d. In the example shown in FIG. 10, the first processor that is selected to send data is the processor 4b. The 1. Xnxt data packet, therefore, contains an identifier of processor 4b, which is provided to the exchange block 72.

In response to receipt of the first Xnxt data packet (i.e. "1. Xnxt" from the master processor 4a), the exchange block 72 controls its switching circuitry 90 (not shown in FIG. 10) to connect to the exchange bus of processor 4b. Therefore, any data packets sent by processor 4b on its bus will be sent over the interface associated with the exchange block 72.

Additionally, in response to receipt of the first Xnxt data packet (i.e. "1. Xnxt" from the master processor 4a), the exchange block 72 sends a message to the processor 4b to grant permission to processor 4b to send data. This message takes the form of an Xnxt data packet and is shown in FIG. 10 as "2. Xnxt". This Xnxt data packet is sent via the exchange bus of the XB 72 in the switching fabric 34. Upon receipt of the message, processing circuitry of the processor 4b sets the Xnxt indication in storage 80 of that processor 4b to indicate that the processor 4b has permission to send data.

In response to the setting of the Xnxt indication in the processor 4b, the processor 4b sends one or more egress data packets to a destination external to the device 60. These one or more data packets are shown in FIG. 10 as "3. Data". Since the exchange block 72 is connected to the exchange bus of processor 4b, those data packets are sent via the exchange block 72 to the interface 71 for that XB 72. From there, they are sent externally to the device 60.

Once the processor 4b has sent all of the data packets that it has scheduled to send in response to the grant of permission by the "2. Xnxt" packet, the processor 4b then sends a message to the exchange block 72 providing an indication to that exchange block 72 of the next processor 4 that has data to send. This message takes the form of an Xnxt packet and is shown in FIG. 10 as "4. Xnxt". In the example shown in FIG. 10, this message identifies the processor 4d as being the next processor 4 to send data. In addition to sending the "4. Xnxt" message, processing circuitry of the processor 4b also sets the Xnxt indication held in the storage 80 of processor 4b, such that the processor 4b is prevented from sending data.

In response to receipt of the "4. Xnxt" message from processor 4b identifying processor 4d as the next processor to send data, the XB 72 sends a message to processor 4d to grant permission to that processor 4d to send data externally to the device 60. This message is shown as "5. Xnxt" in FIG. 10. In response to receipt of the "5. Xnxt" message, processing circuitry of the processor 4d sets the Xnxt indication in storage 80 of that processor 4d to indicate that the processor 4d has permission to send data. In response to setting of the Xnxt indication in the processor 4d, the processor 4d sends one or more data packets (shown as "6. Data") to a destination external to the device 60.

Once all of the processors 4a-d in the set of processors 61 have sent their data for the external exchange phase, optionally one of those processors 4a-d may send to the XB 72 an indication of the next processor 4 in the device that will serve as the master processor 4 for the XB 72. In response to receipt of this indication, the XB 72 controls its switching circuitry 90 to connect to the exchange bus of this next master processor 4 and awaits receipt of an Xnxt packet when the next external exchange phase participated in by that next master processor 4 begins.

Alternatively, as noted above, the master processor 4 for the XB 72 may be fixed throughout different external exchange phases. In the case that the master processor 4 is the same processor 4 in the different phase, the XB 72 may store an identifier of that XB 72. The XB 72 controls its switching circuitry 90 to connect to its master processor 4 in response to receipt of a null processor identifier from the last of the processors 4 to send in sequence.

Figure 11:
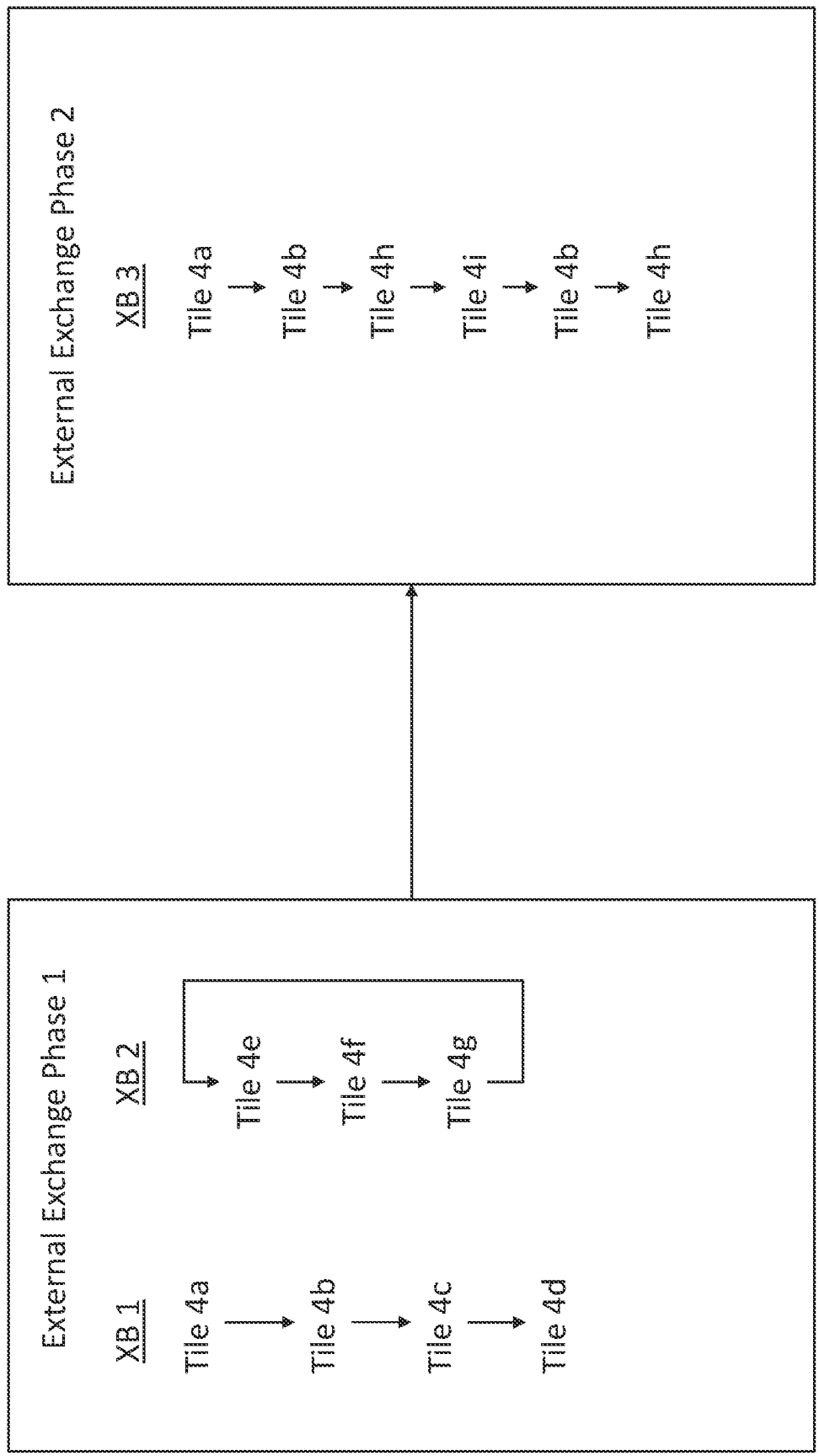
FIG. 11 illustrates an example of sequences in which processors may be configured to send data during different exchange phases.

Reference is FIG. 11, which illustrates the schedule of sends by different sets of processors 4 associated with different XBs 72 during different external exchange phases. Each of these XBs 72 in the example is operable to receive egress data from its associated processors 4 in the manner described above with respect to FIG. 9. It is noted that the sets of processors 4 associated with each XB 72, in this example, are the same as the sets of processors 4 shown in the example of FIG. 8. This reflects that each set of processors 4 that sends it data via a given XB 72 during a particular external exchange phase is also configured to connect to the exchange bus of that XB 72 for receipt of data during that external exchange phase. This enables each processor 4 in the set of processors 4 to receive any data packets sent by its associated XB 72 that are marked for reception at that processor 4. During the same exchange phase, the XB 72 switches between 'listening' (i.e. connected to the exchange bus of) to different ones of its set of processors 4 for the exchange phase.

An example of the order in which processors 4a-d may send data during the first external exchange phase (i.e. 'External Exchange Phase 1') is given. In this exchange phase, the processors 4 progress through a linear sequence in which each of the processors 4a-d receives permission once in which to send its scheduled egress data for that exchange phase. In this example, once one of the processors 4a-d has sent its egress data for the exchange phase, it passes permission to the next of the processors 4a-d in the sequence by sending an Xnxt packet to XB 1 identifying the next of the processors 4a-d and does not send egress data again until the next exchange phase. Between the sending of the egress data by each of processors 4a-d, an Xnxt message is sent by the one of the processors 4a-d to XB 1, which causes XB 1 to connect to the exchange bus of the next one of the processors 4a-d.

An example of the order in which processors 4e-g send data during the first external exchange phase is given. In this exchange phase, a loop is implemented in which processors 4e-g send data in the same sequence multiple times during the first exchange phase. In the example shown processor 4e sends egress data during an allocated period of time, followed by processor 4f, followed by processor 4g. Processor 4g identifies, via an Xnxt packet, processor 4e as the next processor 4 in the sequence of processors 4 with egress data to send during the following period of time. The sequence then repeats multiple times during the exchange phase. Between the sending of egress data by each of processors 4e-g, an Xnxt message is sent by the one of the processors 4e-g to XB 2, which causes the XB 2 to connect to the exchange bus of the next one of the processors 4e-g.

An example of the order in which processors 4a,b,h,i may send egress data during the second external exchange phase (i.e. 'External Exchange Phase 2') is given. In the second exchange phase, processors 4a,b,h,i are allocated multiple separate time periods in which to send egress data. However, unlike the first exchange phase, the sequence in the second exchange phase follows an irregular pattern, rather than a repeating loop. Between the sending of egress data by each of processors 4a,b,h,i, an Xnxt message is sent by the one of the processors 4a,b,h,i to XB 3, which cause the XB 3 to connect to the exchange bus of the next one of the processors 4a,b,h,i.

It would be appreciated from the example given in FIG. 11 that different processors 4 may be associated with different XBs 72 during different exchange phases. For example, processor 4a is associated with XB 1 during the first external exchange phase and with XB 3 during the second external exchange phase. The different XBs 72 are configured to listen to this processor 4a at different times as instructed based on the Xnxt packets received from one or more of the processors 4, and hence ultimately based on the compiled code held in one or more of the processors 4. Hence, the same processor 4a can send data via any interface selected for any external exchange phase, where this selection is made by the compiled code running on at least one of the processors 4.

Figure 12:
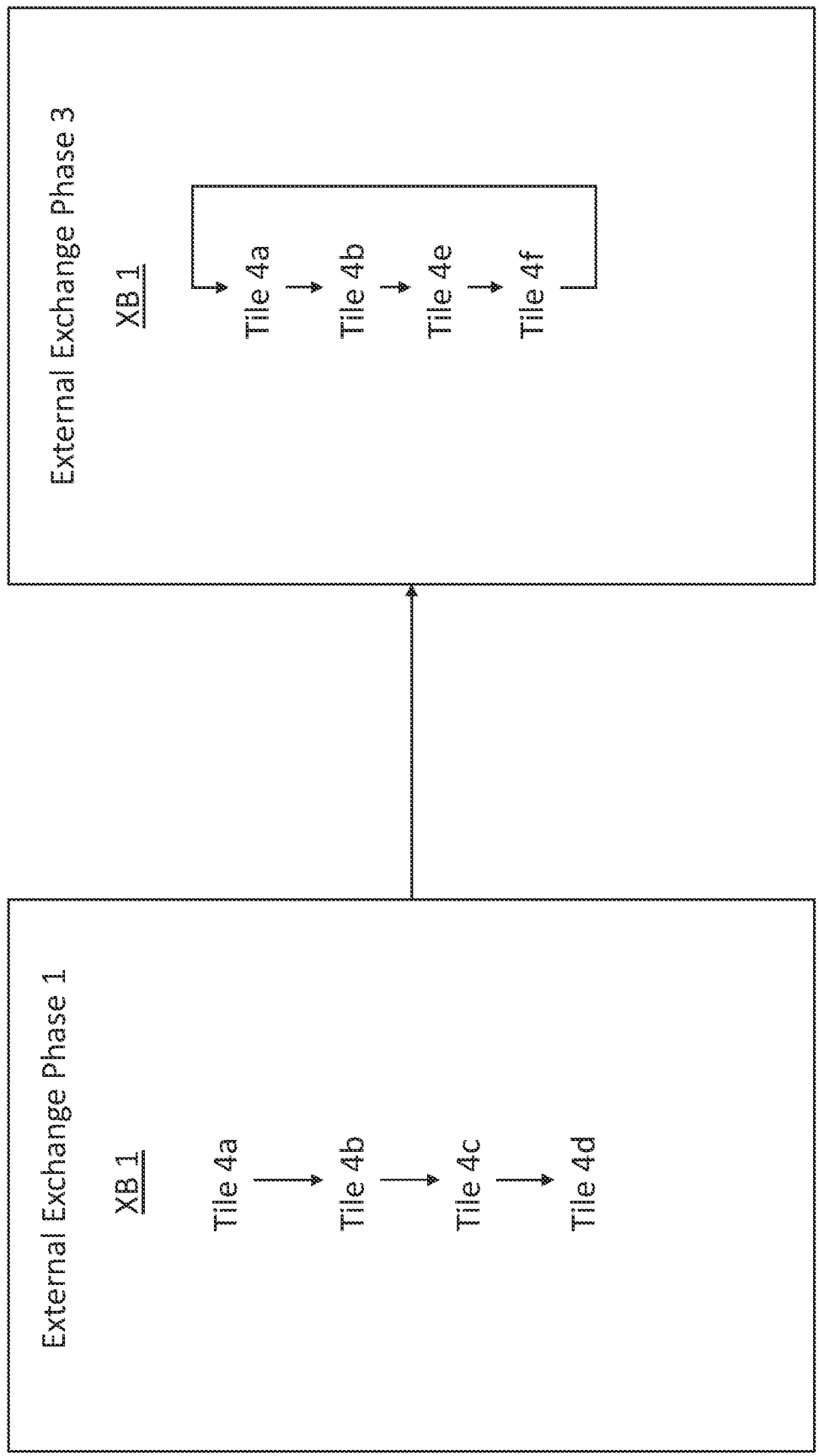
FIG. 12 illustrates a further example of sequences in which processors may be configured to send data during different exchange phases.

Reference is made to FIG. 12, which illustrates an example of how the set of processors 4 associated with an XB 72 may change between external exchange phases.

During the first external exchange phase (i.e. 'External Exchange Phase 1'), XB 1 connects to different ones of the processors 4a-d at different times during the first external exchange phase responsive to control information (e.g. Xnxt data packets) provided by at least one processor 4 of the device 60.

During a further external exchange phase (i.e. 'External Exchange Phase 3'), the same XB (i.e. XB 1) connects to different ones of the processors a,b,e,f at different times during the third external exchange phase responsive to control information (e.g. Xnxt data packets) provided by at least one processor 4 of the device 60.

Hence, in this example, XB 1 is configured to connect (for receipt of egress data and Xnxt messages) to a set of processors (i.e. processors 4a,b,e,f) in the further external exchange phase that is different to the set of processors (i.e. processors 4a-d) that it connects to during the first external exchange phase. Furthermore, the set of processors (i.e. processors 4a,b,e,f) configured to connect to XB 1 (for receipt of ingress data and Xnxt messages) during the further external exchange phase is different to the set of processors (i.e. processors 4a-d) that connects to XB 1 during the first external exchange phase.

Examples have been given in which the different processors 4 participating in an external exchange phase both send egress data packets and receive ingress data packets. However, one or more of the processors 4 participating in an external exchange phase may receive ingress data only or send egress data only.

Examples have been described in which the control information provided by processors 4 to the XBs 72 to control their multiplexer 90 selection is provided in Xnxt data packets, which are sent by each processor 4 after it has finished sending its data for the external exchange phase. However, in other embodiments, the XBs 72 may receive from a processor 4, an ordered list of processors 4 configured to send via its associated interface 71 during a given exchange phase. Each XB 72 may then send messages to those processors 4 to grant them permission to send data in turn. This scheme is described in more detail in U.S. application Ser. No. 16/165,607, which is incorporated by reference.

Figure 13:
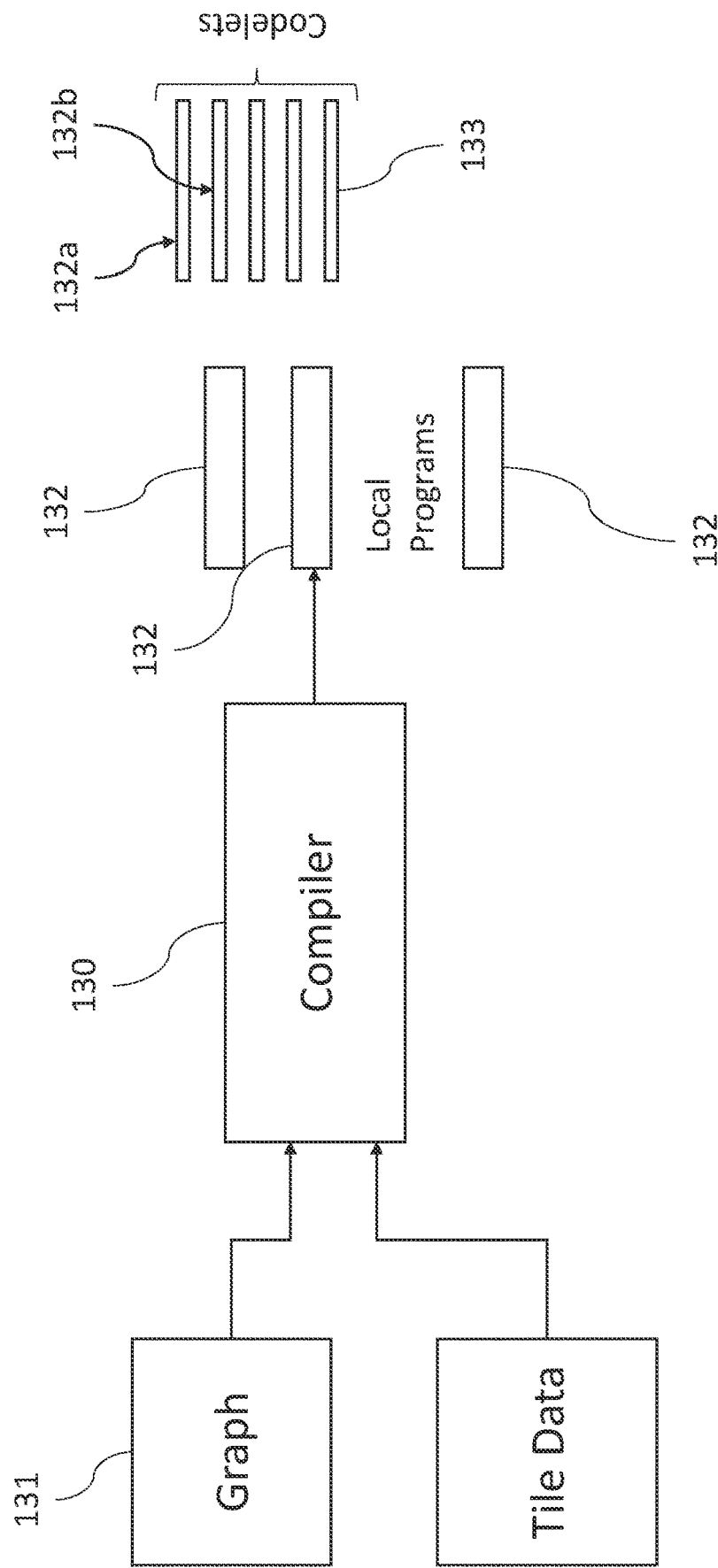
FIG. 13 illustrates an example of the compilation of local programs for execution on each of the processors.

Reference is made to FIG. 13, which is a schematic diagram illustrating the function of a compiler 130. The compiler 130 outputs executable code forming a computer program for running on a data processing system. The executable code comprises local programs 132 for running on each of the processors 4 of the data processing system. The data processing system includes the device 60. The data processing system also includes further devices having the same design and operating in the same way as the described device. The data processing system has a plurality of memory modules for storing application data that may be accessed and stored during execution of the computer program. The different devices and memory modules may be accessible via different interfaces 71 of the device.

The compiler 130 receives such a graph 131 and compiles the functions in the graph 131 into a multiplicity of codelets, which are contained in the local programs labelled 132 in FIG. 13. Each local program 132 is designed to be loaded into a particular processor 4 of the computer. Each program comprises one or more codelets forming worker threads 132a, 132b . . . plus a supervisor sub-program 133, each of these being formed of a sequence of instructions. The local programs 132 together form a computer program that runs at least on the device 60.

As part of the compilation process, the compiler 130 provides in the local programs 132 for each of the processors 4, the indications as to which of the interfaces 71 of the device 60, different processors 4 will be associated with during different external exchange phases. These indications that are provided in the local programs 132 allocated to the processors 4 are used by each processor 4 to control its own switching circuitry 73 to connect to the appropriate interface 71 during the appropriate external exchange phase. The indications are also used by one or more of the processors 4 to provide control information (e.g. in the form of Xnxt packets) to the XBs 72 to cause the XBs 72 to control their switching circuitry 90 to connect to the appropriate processor 4 that has data to send over its interface. The compiler defines this internal connectivity between processors 4 and external interfaces 71 for the device 60 and for the other equivalent devices in the data processing system. In this way, the connectivity is compiler defined.

Figure 14:
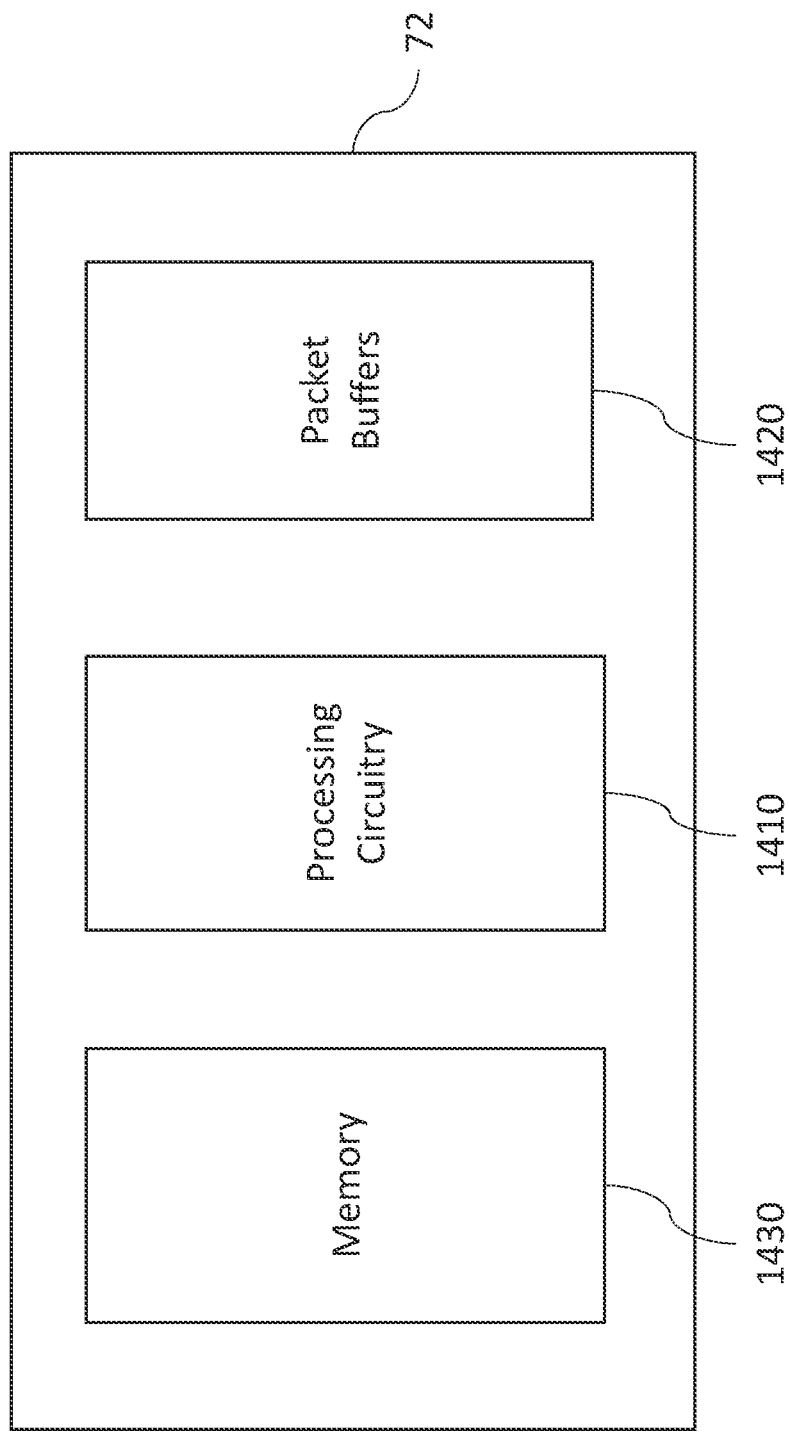
FIG. 14 is a schematic diagram of an exchange block.

Reference is made to FIG. 14, which illustrates an example of an XB 72 and illustrates example internal components.

The XB 72 comprises processing circuitry 1410 that is responsible for performing the operations describes above as being performed by the XB 72. These operations include performing conversion of packets between Elink and Tlink, providing control signals to control the XB's switching circuitry 90, processing received control information (e.g. in Xnxt packets) and providing control information (e.g. in Xnxt packets) to processors 4. The processing circuitry 1410 may comprise dedicated hardware, e.g. a field programmable gate array (FPGA) or an application specific integrated circuit (ASIC), dedicated to perform one or more of the functions performed by the XB 72. Additionally or alternatively, the processing circuitry 1410 may comprise at least one processor configured to execute computer readable instructions to perform one or more of the functions performed by the XB 72.

The XB 72 also comprises packet buffers 1420 for buffering data packets received the XB's interface 71 before those data packets are provided via the switching fabric 34 to ones of the processors 4. The packet buffers 1420 also buffer data packets received from processors 4 before those data packets are provided over the interface 71 associated with the XB 72.

The XB 72 may comprise a memory 1430 for storing information (e.g. the currently selected processor 4 the XB is listening to) used by the XB 72 to perform its operations and for storing any computer readable instructions for execution by the processing circuitry 1410.

Figure 15:
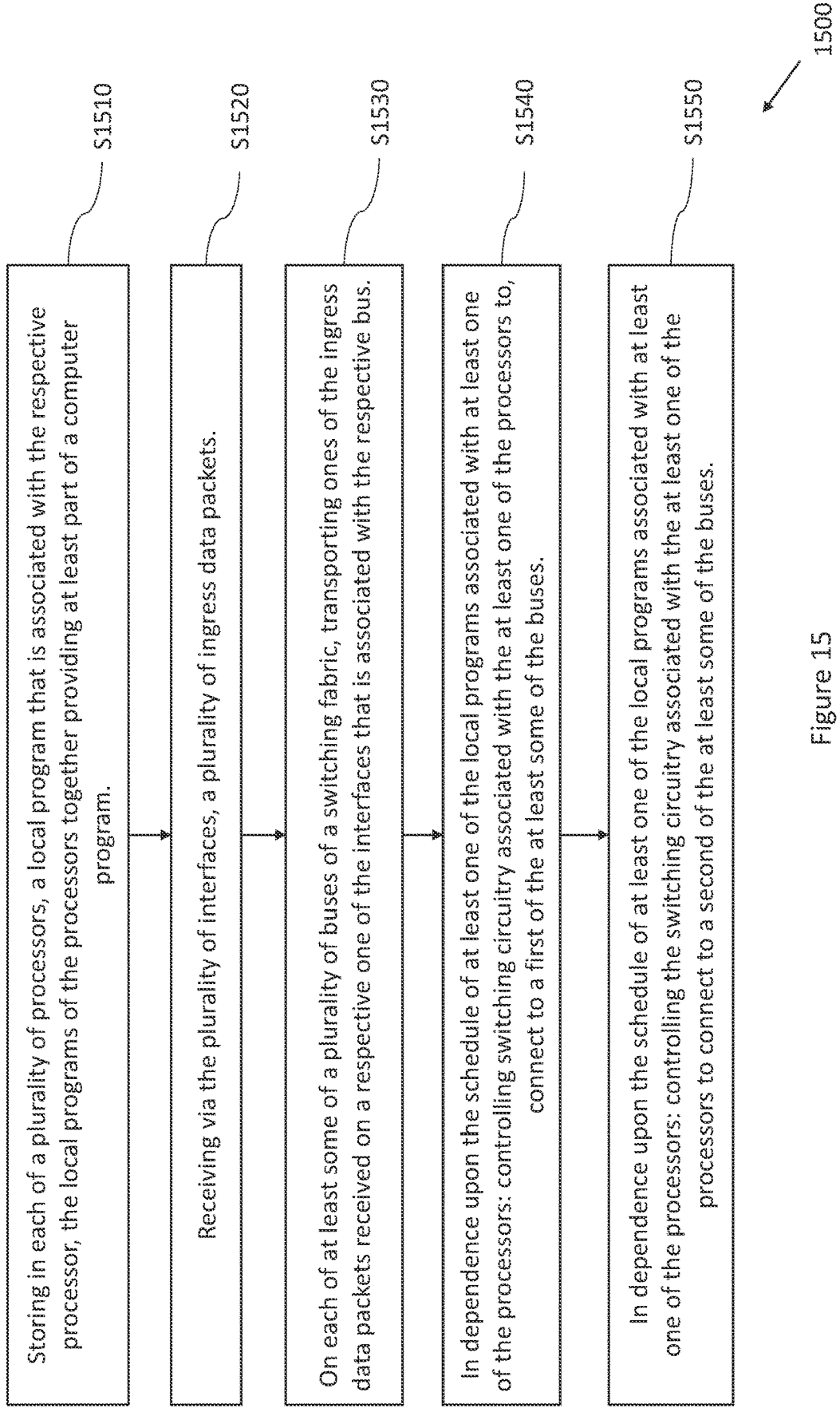
FIG. 15 illustrates a method for delivering ingress data packets from external interfaces to processors.

Reference is made to FIG. 15, which illustrates a method 1500 for receiving ingress data. The method 1500 is implemented in device 60.

At S1510, a local program is stored in each of the plurality of processors 4 of the device 60. These local programs form part of a computer program for a system, the system including the device 60 and one or more external devices with which the device 60 communicates.

At S1520, a plurality of ingress packets are received on a plurality of interfaces 71 of the device 60. Different ones of these ingress packets are received on different ones of the interfaces 71. Although S1520 is shown earlier in the method 1500 than the remaining steps—i.e. S1530, S1540 and S1550—this step overlaps in time with the remaining steps—i.e. S1530, S1540 and S1550.

At S1530, the received ingress packets are transported on the exchange buses of the switching fabric 34 that are associated with the interfaces 71 on which the ingress packets are received. Although S1530 is shown earlier in the method 1500 than the remaining steps—i.e. S1540 and S1550—this step overlaps in time with the remaining steps—i.e. S1540 and S1550.

At S1540, at least one of the processors 4, in dependence upon the schedule in its associated local program, controls its associated switching circuitry 73 to connect to a first of the exchange buses, which is associated with a first of the interfaces 71. S1540 is performed during a first of the phases of execution of the computer program. S1540 may be performed separately by a plurality of processors 4 or by a single processor 4.

At S1550, the at least one of the processors 4, in dependence upon the schedule in its associated local program controls its associated switching circuitry 73 to connect to a second of the exchange buses, which is associated with a second of the interfaces 71. S1550 is performed during a second of the phases of execution of the computer program. S1550 may be performed separately by a plurality of processors 4 or by a single processor 4. In either case, S1550 is performed by the same one or more processors 4 that perform S1540.

Figure 16:
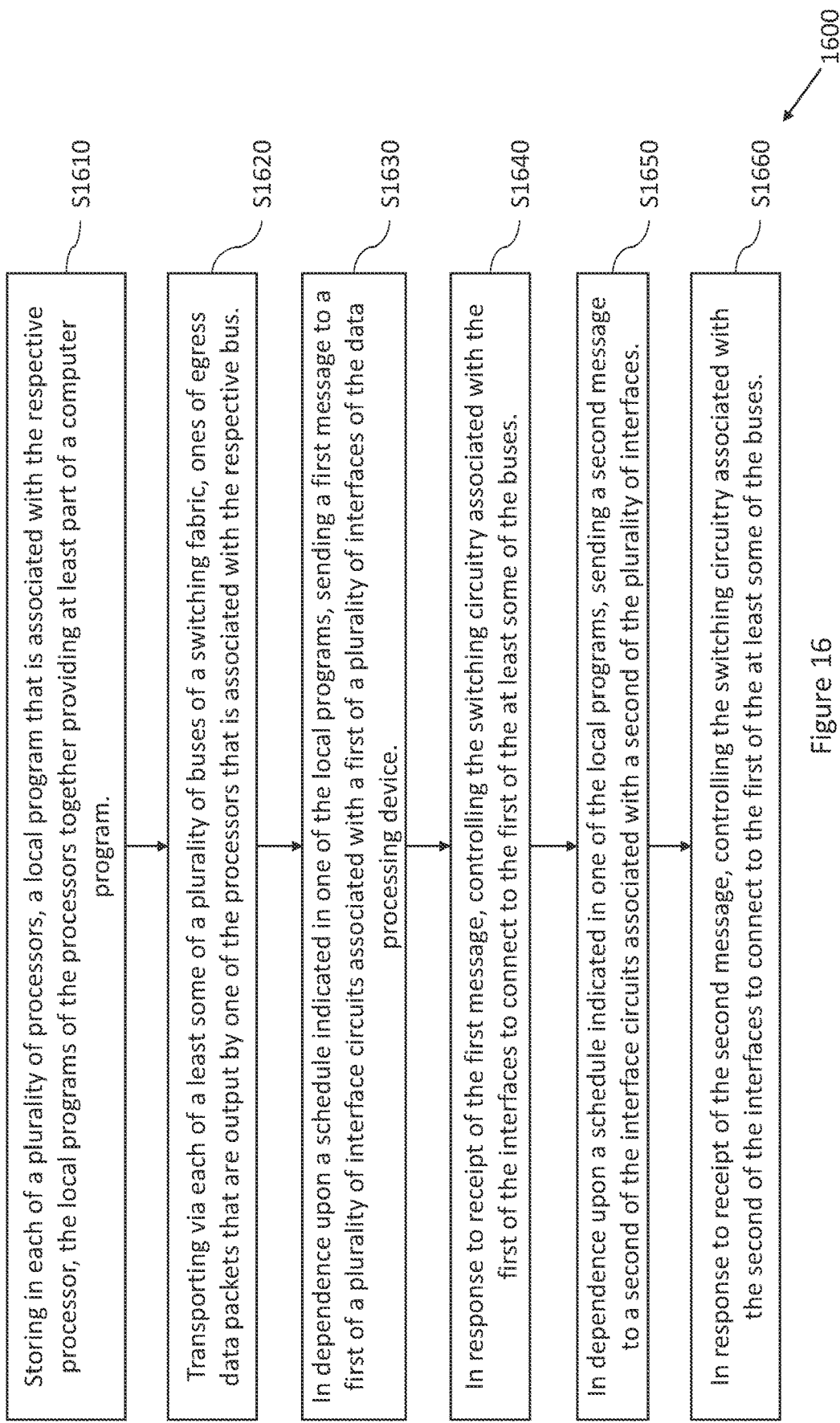
FIG. 16 illustrates a method for delivering egress data packets from processors to external interfaces.

Reference is made to FIG. 16, which illustrates a method 1600 for sending egress data. The method is implemented in device 60.

At S1610, a local program is stored in each of the plurality of processors 4. These local programs form part of a computer program for a system, the system including the device 60 and one or more external devices with which the device 60 communicates. S1610 may be the same as S1510.

At S1620, egress packets output by processors 4 are transported on the exchange buses of the switching fabric 34. Each the egress packets is transported on an exchange bus that is associated with one of the processors 4 that outputs the packet. Although S1620 is shown earlier in the method 1600 than the remaining steps S1630, S1640, S1650, this step overlaps in time with the remaining steps S1630, S1640, S1650.

At S1630, one of the processors 4 in dependence upon a schedule indicated in its local program, sends a first message to a first of a plurality of interface circuits 72 associated with a first of a plurality of interfaces 71 of the data processing device 60. The first message is a control message (e.g. Xnxt packet) that identifies a first processor 4. The first processor 4 may be the same or different to the one of the processors 4 that sends the first message.

At S1640, in response to receipt of the first message, the first of the interface circuits 72 controls the switching circuitry 90 associated with the first of the interfaces 71 to connect to the first of the at least some of the buses. This enables the first of the interface circuits 72 and the first of the interfaces 71 to receive egress data packets from the first processor 4, with these egress data packets being provided over the first of the interfaces 71. S1640 is performed during a first of the phases of execution.

At S1650, one of the processors 4 in dependence upon a schedule indicated in its local program, sends a second message to a second of a plurality of interface circuits 72 associated with a second of the plurality of interfaces 71 of the data processing device 60. The second message is a control message (e.g. Xnxt packet) that identifies the first processor 4. The first processor 4 may be the same or different to the one of the processors 4 that sends the first message.

At S1660, in response to receipt of the second message, the second of the interface circuits 72 controls the switching circuitry 90 associated with the second of the interfaces 71 to connect to the first of the at least some of the buses. This enables the second of the interface circuits 72 and the second of the interfaces 71 to receive egress data packets from the first processor 4, with these egress data packets being provided over the second of the interfaces 71. S1660 is performed during a second of the phases of execution.

Various embodiments have been described in terms of operations performed by an XB 72. Each of the XBs 72 is configured to operate in the same manner, and so the teaching with respect to a single XB 72 also applies to others of the XBs 72. However, it is noted that not every XB 72 need participate in every external exchange phase. In some external exchange phases, an XB 72 may not be associated with any of the processors 4 participating in that external exchange phases and hence may not receive either ingress or egress data packets. Furthermore, in some external exchange phases, an XB 72 may participate by receiving ingress data packets and dispatching these on to its exchange bus, without receiving any egress data packets during that exchange phase. Similarly, during an external exchange phase, an XB 72 may participate by connecting to different processor's exchanges buses so as to receive egress data packets and dispatch them over its associated interface 71.

The above examples have been described in the context of BSP, in which the phases of execution of the computer program are exchange phases of a BSP compute-exchange cycle. However, embodiments are not limited to BSP and may be implemented in the context of other models.

It will be appreciated that the above embodiments have been described by way of example only.

The invention claimed is:

1. A data processing device comprising:
a plurality of processors, each of the processors comprising an instruction memory storing a local program that is associated with the respective processor, the local programs of the processors together providing at least part of a computer program;
a plurality of interfaces enabling ingress data packets received from external devices to be provided to the plurality of processors;
a switching fabric comprising a plurality of buses, wherein each of at least some of the buses is associated with a respective one of the interfaces and is configured to transport ones of the ingress data packets received on the respective one of the interfaces; and
for each of the plurality of processors, switching circuitry associated with the respective processor,
wherein each of at least some of the local programs comprises a schedule defining, for different phases of execution of the computer program, which of the interfaces its associated one of the processors is scheduled to connect to,
wherein at least one of the plurality of processors is configured to, in dependence upon the schedule in its associated local program:
control its associated switching circuitry to, during a first of the phases of execution of the computer program, connect to a first of the at least some of the buses so as to enable reception of a first set of the ingress data packets from a first of the interfaces that is associated with the first of the at least some of the buses; and
control its associated switching circuitry to, during a second of the phases of execution of the computer program, connect to a second of the at least some of the buses so as to enable reception of a second set of the ingress data packets from a second of the interfaces that is associated with the second of the at least some of the buses,
wherein the second of the interfaces is configured to receive a third set of ingress data packets during the first of the phases of execution of the computer program,
wherein a further at least one of the processors is configured to:
control its associated switching circuitry to, during the first of the phases of execution of the computer program, connect to the second of the at least some of the buses so as to enable reception of the third set of the ingress data packets from the second of the interfaces.

2. The data processing device of claim 1, wherein the first one of the processors is configured to, for each of the first set of the ingress data packets:
check a destination identifier in the respective data packet;
if the destination identifier indicates that the respective data packet is for delivery to the first one of the processors, accept the respective data packet; and
if the destination identifier indicates that the respective one of the ingress data packets is not for delivery to the first one of the processors, do not accept the respective data packet.

3. The data processing device of claim 1, wherein the first of the interfaces is associated with a first set of the processors for the first of the phases of execution, wherein each of the first set of the processors is configured to:
in dependence upon the schedule in its associated one of the local programs, control its associated switching circuitry to, during the first of the phases of execution of the computer program, connect to the first of the at least some of the buses so as to enable reception of the first set of the ingress data packets from the first of the interfaces; and
for each of the first set of the ingress data packets:
check a destination identifier in the respective data packet;
if the destination identifier indicates that the respective data packet is for delivery to that respective one of the first set of the processors, accept the respective data packet; and
if the destination identifier indicates that the respective data packet is not for delivery to that respective one of the first set of the processors, do not accept the respective data packet.

4. The data processing device of claim 1, wherein the plurality of interfaces enable egress data packets output by the plurality of processors to be sent to the external devices,
wherein the plurality of buses comprises a second set of busses in addition to the at least some of the buses, each of the second set of buses being associated with one of the processors and configured to transport ones of the egress data packets output by its associated one of the processors,
wherein the data processing device comprises, for each of the plurality of interfaces, switching circuitry associated with the respective interface and interface circuitry associated with the respective interface,
wherein for each of the plurality of interfaces, the respective interface circuitry is configured to control the respective switching circuitry to connect the respective interface to a respective selected one of the second set of buses to enable sending of at least one of the egress data packets over the respective interface.

5. The data processing device of claim 1, wherein for the at least one of the plurality of processors:
the controlling its associated switching circuitry to connect to the first of the at least some of the buses comprises executing a switch control instruction to cause a first input of the associated switching circuitry to be selected, the first input being associated with the first of the at least some of the buses; and
the controlling its associated switching circuitry to connect to the second of the at least some of the buses comprises executing a switch control instruction to cause a second input of the associated switching circuitry to be selected, the second input being associated with the second of the at least some of the buses.

6. The data processing device of claim 1, wherein each of the buses of the switching fabric comprises a plurality of pipeline stages and is configured to transport data in a number of clock cycles that is fixed for a given number of pipeline stages traversed by that data.

7. The data processing device of claim 1, wherein the different phases of execution are exchange phases, wherein the plurality of processors are configured to alternate between operation in compute phases and the exchange phases, the compute phases and the exchange phases being separated by barrier synchronisations enforced between at least some of the processors.

8. A data processing device comprising:
a first processor, comprising a first instruction memory storing a first local program;

a second processor, comprising a second instruction memory storing a second local program, the first local program and the second local program together providing at least part of a computer program;

a first interface and a second interface enabling egress data packets to be provided to external devices;

a switching fabric comprising a first bus that is associated with the first processor and is configured to transport ones of the egress data packets that are output by the first processor, the switching fabric further comprising a second bus that is associated with the second processor and is configured to transport ones of the egress data packets that are output by the second processor, first switching circuitry associated with the first interface and a first interface circuit associated with the first interface, second switching circuitry associated with the second interface and a second interface circuit associated with the second interface, wherein the first processor is configured to, in dependence upon a schedule indicated in the first local program, send a first message to the first interface circuit identifying the second processor, wherein the first interface circuit is configured to, during a first phase of execution of the computer program, and in response to receipt of the first message, control the first switching circuitry to connect to the second bus so as to enable reception, at the first interface, of a first set of one or more egress data packets from the second processor, wherein a third processor of the data processing device is configured to, in dependence upon the schedule or a different schedule, send a second message to the second interface circuit identifying the second processor, wherein the second interface circuit is configured to, during a second phase of execution of the computer program, and in response receipt of the second message, control the second switching circuitry to connect to the second bus so as to enable reception, at the second interface, of a second set of one or more egress data packets from the second processor, wherein the first interface circuit is configured to receive the first message by controlling the first switching circuitry to connect to the first bus, wherein the second interface circuit is configured to receive the second message by controlling the second switching circuitry to connect to the first bus.

9. The data processing device of claim 8, wherein the switching fabric comprises a third bus, which is associated with the first interface circuit and is configured to transport data output by the first interface circuit, the switching fabric further comprising a fourth bus, which is associated with the second interface circuit and is configured to transport data output by the second interface circuit.

10. The data processing device of claim 8, wherein the first bus comprises a plurality of pipeline stages and is configured to transport data in a number of clock cycles that is fixed for a given number of pipeline stages traversed by that data.

11. The data processing device of claim 8, wherein the first phase and the second phase are exchange phases, wherein the first processor and the second processor are configured to alternate between operation in compute phases and the exchange phases, the compute phases and the exchange phases being separated by barrier synchronisations enforced between at the first processor and the second processor.

12. The data processing device of claim 8, wherein the third processor comprises the first processor.

13. A method implemented in a data processing device, the method comprising:

storing a first local program in a first processor and a second local program in a second processor, the first local program and second local program together providing at least part of a computer program, wherein the first local program comprises a first schedule defining, for different phases of execution of the computer program, which of a plurality of interfaces of the data processing device the first processor is scheduled to connect to;

wherein the second local program comprises a second schedule defining, for the different phases of execution of the computer program, which of a plurality of interfaces of the data processing device the second processor is scheduled to connect to;

receiving via the plurality of interfaces, a plurality of ingress data packets;

transporting ones of the ingress data packets on a plurality of buses of a switching fabric, each one of the interfaces being associated with a respective one of the buses;

in dependence upon the first schedule:

controlling switching circuitry associated with the first processor to, during a first of the phases of execution of the computer program, connect to a first one of the buses so as to enable reception, at the first processor, of a first set of the ingress data packets from a first of the interfaces that is associated with the first one of the buses; and controlling the switching circuitry to, during a second of the phases of execution of the computer program, connect to a second one of the buses so as to enable reception, at the first processor, of a second set of the ingress data packets from a second of the interfaces that is associated with the second one of the buses, wherein the different phases of execution are exchange phases, wherein the plurality of processors are configured to alternate between operation in compute phases and the exchange phases, the compute phases and the exchange phases being separated by barrier synchronisations enforced between at least some of the processors.

14. A method implemented in a data processing device, the method comprising:

storing a first local program in a first processor and a second local program in a second processor, the first local program and second local program together providing at least part of a computer program, transporting via a plurality of buses of a switching fabric, egress data packets that are output by the first processor and the second processor;

in dependence upon a schedule indicated in the first local program, sending a first message to a first of a plurality of interface circuits associated with a first of a plurality of interfaces of the data processing device, the first message identifying the second processor;

during a first phase of execution of the computer program, and in response to receipt of the first message, controlling switching circuitry associated with the first of the interfaces to connect to a first one of the buses so as to enable reception, at the first of the interfaces, of a first set of the egress data packets from the second processor, wherein the second processor is associated with the first one of the buses;

in dependence upon the schedule or a different schedule indicated in a further local program, sending a second message to a second of the interface circuits associated with a second of the plurality of interfaces, the second message identifying the second processor;

during a second phase of execution of the computer program, and in response to receipt of the second message, controlling switching circuitry associated with the second of the interfaces to connect to the first one of the buses so as to enable reception, at the second of the interfaces, of a second set of the egress data packets from the second processor, wherein the first phase of execution and second phase of execution are exchange phases, wherein the plurality of processors are configured to alternate between operation in compute phases and the exchange phases, the compute phases and the exchange phases being separated by barrier synchronisations enforced between at least some of the processors.

15. A non-transitory computer readable medium storing a computer program comprising a plurality of local programs, a first local program being associated with a first processor and a second local program being associated with a second processor, the first local program and the second local program together providing at least part of the computer program, wherein the first local program comprises a schedule defining, for different phases of execution of the computer program, which of a plurality of interfaces of a data processing device the first processor is scheduled to connect to, wherein the first local program is configured to, in dependence upon the schedule, cause the first processor to:

control switching circuitry associated with the first processor to, during a first of the phases of execution of the computer program, connect to a first bus of a switching fabric so as to enable reception, at the first processor, of a first set of the ingress data packets from a first of the interfaces that is associated with the first bus; and control the switching circuitry to, during a second of the phases of execution of the computer program, connect to a second bus of the switching fabric so as to enable reception, at the first processor, of a second set of the ingress data packets from a second of the interfaces that is associated with the second bus, wherein the different phases of execution are exchange phases, wherein the plurality of processors are configured to alternate between operation in compute phases and the exchange phases, the compute phases and the exchange phases being separated by barrier synchronisations enforced between at least some of the processors.

* * * * *